(12) United States Patent
Sakaue

(10) Patent No.: US 7,995,243 B2
(45) Date of Patent: Aug. 9, 2011

(54) IMAGE PROCESSING APPARATUS AND CONTROL METHOD THEREOF

(75) Inventor: Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1125 days.

(21) Appl. No.: 11/747,045

(22) Filed: May 10, 2007

(65) Prior Publication Data

US 2007/0263256 A1 Nov. 15, 2007

(30) Foreign Application Priority Data

May 15, 2006 (JP) ................................. 2006-135865

(51) Int. Cl.
*G06K 15/00* (2006.01)

(52) U.S. Cl. ........ 358/3.06; 358/2.1; 358/3.22; 358/3.3; 358/1.11; 358/3.27; 358/3.24; 358/462; 382/260; 382/261; 382/262; 382/263; 382/264; 382/265; 382/266; 382/269

(58) Field of Classification Search .................... 358/2.1, 358/3.06, 3.22, 3.3, 1.11, 3.27, 3.24, 462; 382/260–266, 269

See application file for complete search history.

(56) References Cited

U.S. PATENT DOCUMENTS

| | | | | | |
|---|---|---|---|---|---|
| 5,825,937 | A | * | 10/1998 | Ohuchi et al. | 382/261 |
| 6,714,676 | B2 | | 3/2004 | Yamagata et al. | |
| 2003/0156755 | A1 | * | 8/2003 | Watanabe et al. | 382/182 |
| 2004/0125409 | A1 | * | 7/2004 | Yamaguchi et al. | 358/2.1 |
| 2004/0190068 | A1 | * | 9/2004 | Yamaguchi et al. | 358/2.1 |
| 2006/0007497 | A1 | * | 1/2006 | Yokochi | 358/3.27 |
| 2006/0165285 | A1 | * | 7/2006 | Adachi | 382/173 |

FOREIGN PATENT DOCUMENTS

| | | |
|---|---|---|
| JP | 11-085978 | 3/1999 |
| JP | 2006-005806 | 1/2006 |

* cited by examiner

*Primary Examiner* — Chan S Park
*Assistant Examiner* — Kenneth Kwan
(74) *Attorney, Agent, or Firm* — Canon U.S.A. Inc., I.P. Division

(57) ABSTRACT

The invention distinguishes not only character areas and halftone dot areas in an image, but also makes highly accurate decisions concerning characters present in halftone dot areas. A decision signal generating unit generates a decision signal having luminance as a main component from a signal indicating inputted image data, and supplies the decision signal to a character decision unit, a halftone dot decision unit, and a character-in-halftone dot decision unit. The character decision unit generates data indicating whether a pixel of interest is inside a character image area. The halftone dot decision unit generates data indicating whether a pixel of interest is inside a halftone dot area. The character-in-halftone dot decision unit generates data indicating whether there is a character image inside the halftone dot area. Based on these three signals, an attribute flag generating unit generates attribute data of the pixel of interest.

3 Claims, 27 Drawing Sheets

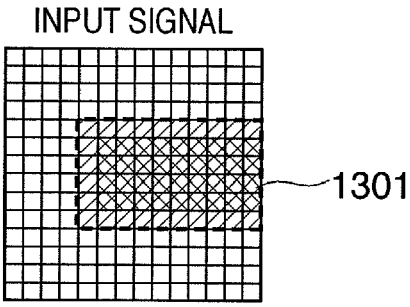
FIG. 5A INPUT SIGNAL
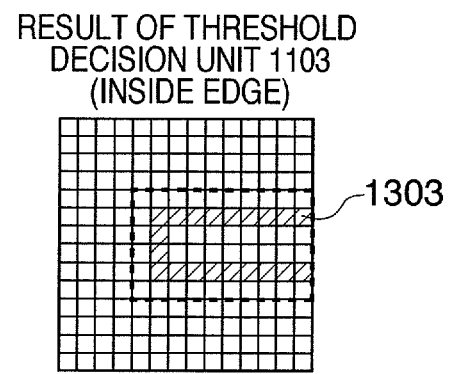
FIG. 5D RESULT OF THRESHOLD DECISION UNIT 1103 (INSIDE EDGE)
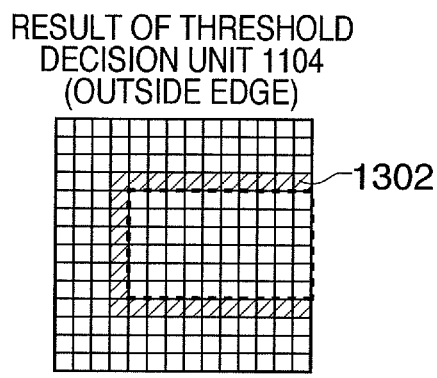
FIG. 5B RESULT OF THRESHOLD DECISION UNIT 1104 (OUTSIDE EDGE)
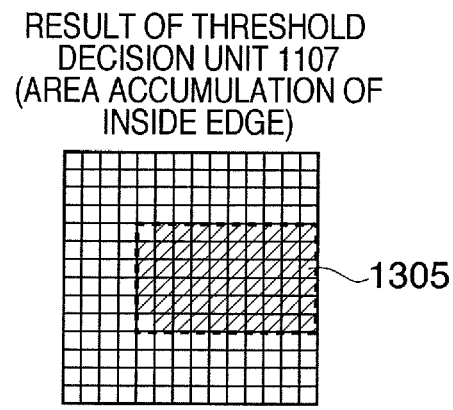
FIG. 5E RESULT OF THRESHOLD DECISION UNIT 1107 (AREA ACCUMULATION OF INSIDE EDGE)
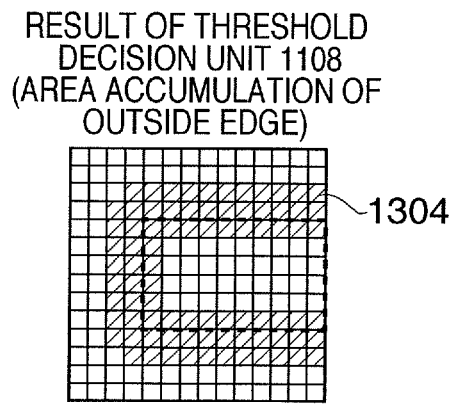
FIG. 5C RESULT OF THRESHOLD DECISION UNIT 1108 (AREA ACCUMULATION OF OUTSIDE EDGE)
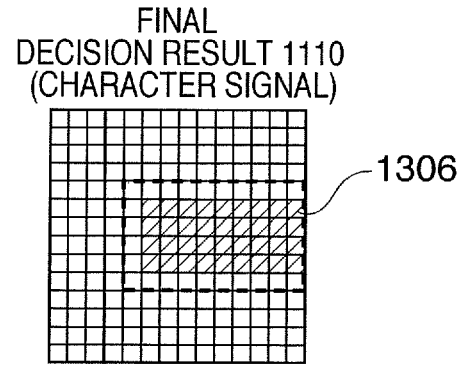
FIG. 5F FINAL DECISION RESULT 1110 (CHARACTER SIGNAL)

FIG. 6

| | 1109 | | | | | | | | |
|---|---|---|---|---|---|---|---|---|---|
| INSIDE EDGE DECISION | 0 | 0 | 0 | 0 | 0 | 1 | 1 | 1 | 1 |
| AREA ACCUMULATION DECISION OF INSIDE EDGE DECISION | 0 | 0 | 1 | 1 | 1 | 0 | 1 | 1 | 1 |
| AREA ACCUMULATION DECISION OF OUTSIDE EDGE DECISION | 0 | 1 | 0 | 1 | 0 | 0 | 1 | 0 | 1 |
| CHARACTER EDGE DECISION | 0 | 0 | 1 | 0 | 1 | 1 | 1 | 1 | 1 |

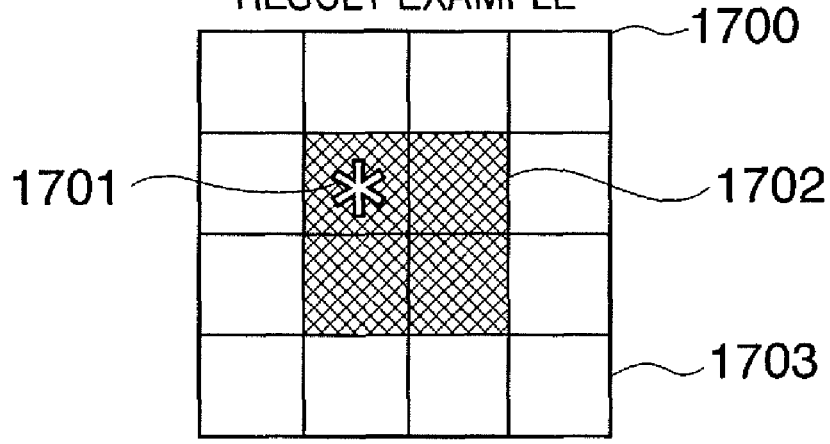
F I G. 9A
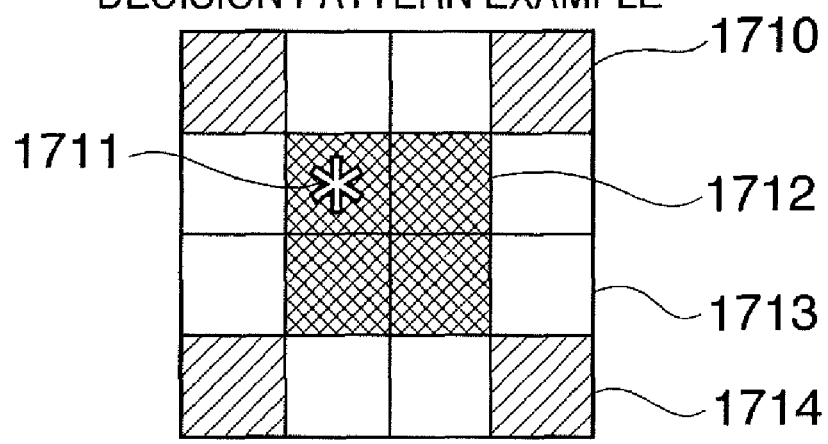
F I G. 9B

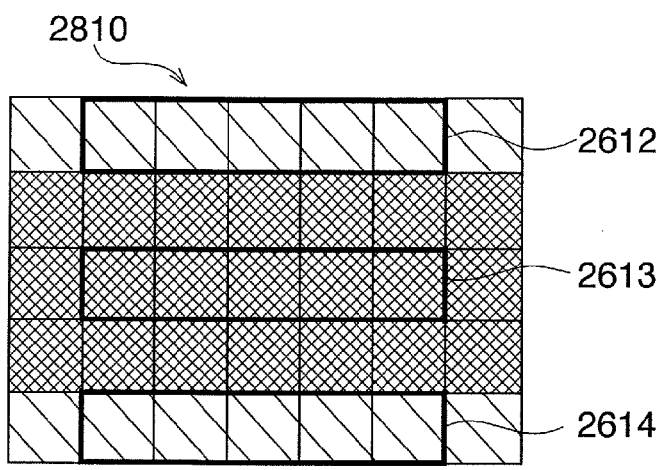
F I G. 20A
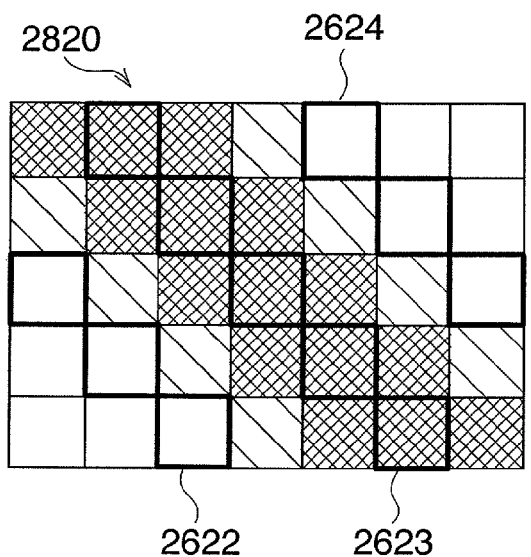
F I G. 20B
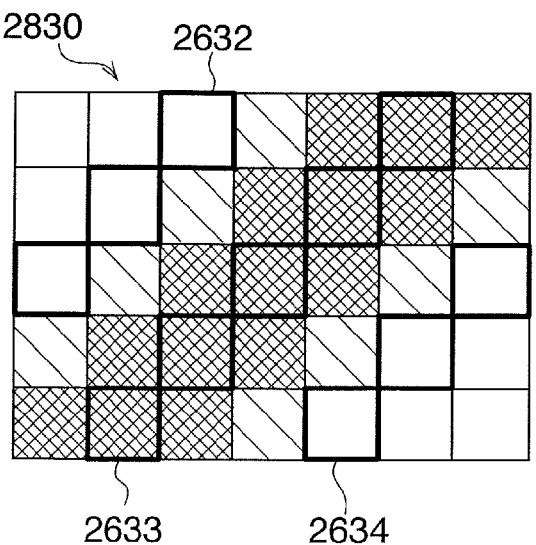
F I G. 20C

IMAGE PROCESSING APPARATUS AND CONTROL METHOD THEREOF

BACKGROUND OF THE INVENTION

1. Field of the Invention

The present invention relates to techniques by which an attribute of each pixel in an image is determined.

2. Description of the Related Art

Apparatuses that extract character edges using a differential filter or the like then classify characters and elements other than characters to execute adaptive processing are known as image processing apparatuses that execute optimal image processing according to image characteristics. Furthermore, apparatuses that take halftone dots of printing as isolation amounts then extract the halftone dots by accumulating the isolation amounts within a predetermined area and classify characters and halftone dots to execute adaptive processing are common (for example, Japanese Patent Laid-Open No. H11-85978.

Furthermore, methods have been proposed that identify not only characters and halftone dots but also extract characters within halftone dots as low frequency edges (for example, Japanese Patent Laid-Open No. 2006-5806.

However, although there is a high extraction capability (accuracy) for halftone dots that express characters on a white background and printed photos and the like with the conventional technique described in Japanese Patent Laid-Open No. H11-85978, the extraction capability for characters and line drawings within halftone dots is low. The extraction capability for characters in halftone dots is improved when the character extraction capability is enhanced as an attempt to extract characters in halftone dots, but at the same time image edges in halftone dots may end up being misidentified, and as a result character processing is executed also on photo image areas of printed materials, which incurs reduced image quality.

To solve this, it is necessary to separately identify characters on a white background and characters in halftone dots and execute suitable processing on these respective characters.

The conventional technique described in Japanese Patent Laid-Open No. 2006-5806 was proposed to solve this issue, but there are several types of halftone dots and it does not satisfactorily separate halftone dots and characters with good accuracy. Therefore, depending on the halftone dot document, there is a problem of moire occurring.

SUMMARY OF THE INVENTION

The present invention has been devised in light of these problems and provides technology that distinguishes not only character areas and halftone dot areas in an image, but also makes highly accurate decisions concerning characters present in halftone dot areas. The present invention provides technology that focuses on characters present in halftone dot areas and decides whether or not there are characters in the areas with high accuracy. Further still, the present invention provides technology that uses the decision results to adaptively switch image processing in response to attributes, thus obtaining high quality printing results in which occurrences of moire are suppressed.

According to an aspect of the present invention, an image processing apparatus in which an attribute of each pixel constituting image data is decided includes: a generation unit adapted to generate a decision signal having luminance as a main component from the image data; a character decision unit adapted to, based on the decision signal generated by the generation unit, generate inside edge data indicating whether a pixel of interest is positioned on an image edge of a low luminance side at which the luminance changes from low luminance to high luminance, outside edge data indicating whether the pixel of interest is positioned on an image edge of a high luminance side at which the luminance changes from high luminance to low luminance, and accumulation data of inside edge data and outside edge data of a predetermined number of pixels positioned around the pixel of interest, and decide whether the pixel of interest is in a character area based on the inside edge data, the outside edge data, and the accumulation data; a halftone dot decision unit adapted to, based on the decision signal generated by the generation unit, generate inside edge data indicating whether the pixel of interest is positioned on an image edge of a low luminance side at which the luminance changes from low luminance to high luminance and outside edge data indicating whether the pixel of interest is positioned on an image edge of a high luminance side at which the luminance changes from high luminance to low luminance, calculate an isolation degree for each of multiple patterns by matching isolation patterns of different sizes against the inside edge data and outside edge data of a predetermined number of pixels around and including the pixel of interest, and decide whether the pixel of interest is in a halftone dot area based on the calculated isolation degrees; an adaptive filter unit adapted to decide whether there is continuity in low luminance pixels of a preset plurality of directions based on the decision signal generated by the generation unit, and allow the decision signal to pass when it is decided that there is continuity and carry out a low pass filter process defined by a preset frequency when it is decided that there is no continuity; a character-in-halftone dot decision unit adapted to, based on the decision signal generated by the adaptive filter unit, generate inside edge data indicating whether the pixel of interest is positioned on an image edge of a low luminance side at which the luminance changes from low luminance to high luminance and decide whether the pixel of interest is a character area in a halftone dot area based on the generated inside edge data; and an attribute data generation unit adapted to generate attribute data of the pixel of interest based on decision results of the character decision unit, the halftone dot decision unit, and the character-in-halftone dot decision unit.

The configuration of the present invention distinguishes not only character areas and halftone dot areas in an image, but can also make highly accurate decisions concerning characters present in halftone dot areas. Furthermore, it uses the decision results to adaptively switch image processing in response to attributes, thus making it possible to obtain high quality printing results in which occurrences of moire are controlled.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5F show various processing signals of the character decision unit.

FIG. 6 shows a data structure of an LUT of the character decision unit.

FIGS. 9A and 9B are diagrams illustrating a pattern matching process of the halftone dot decision unit.

FIGS. 20A to 20C are diagrams illustrating detection examples of line portion detection patterns of the vertical line, horizontal line, and slanted line detection unit.

DESCRIPTION OF THE EMBODIMENTS

Exemplary embodiments of the present invention are described in details below with reference to the accompanying drawings.

First Embodiment

Figure 1:
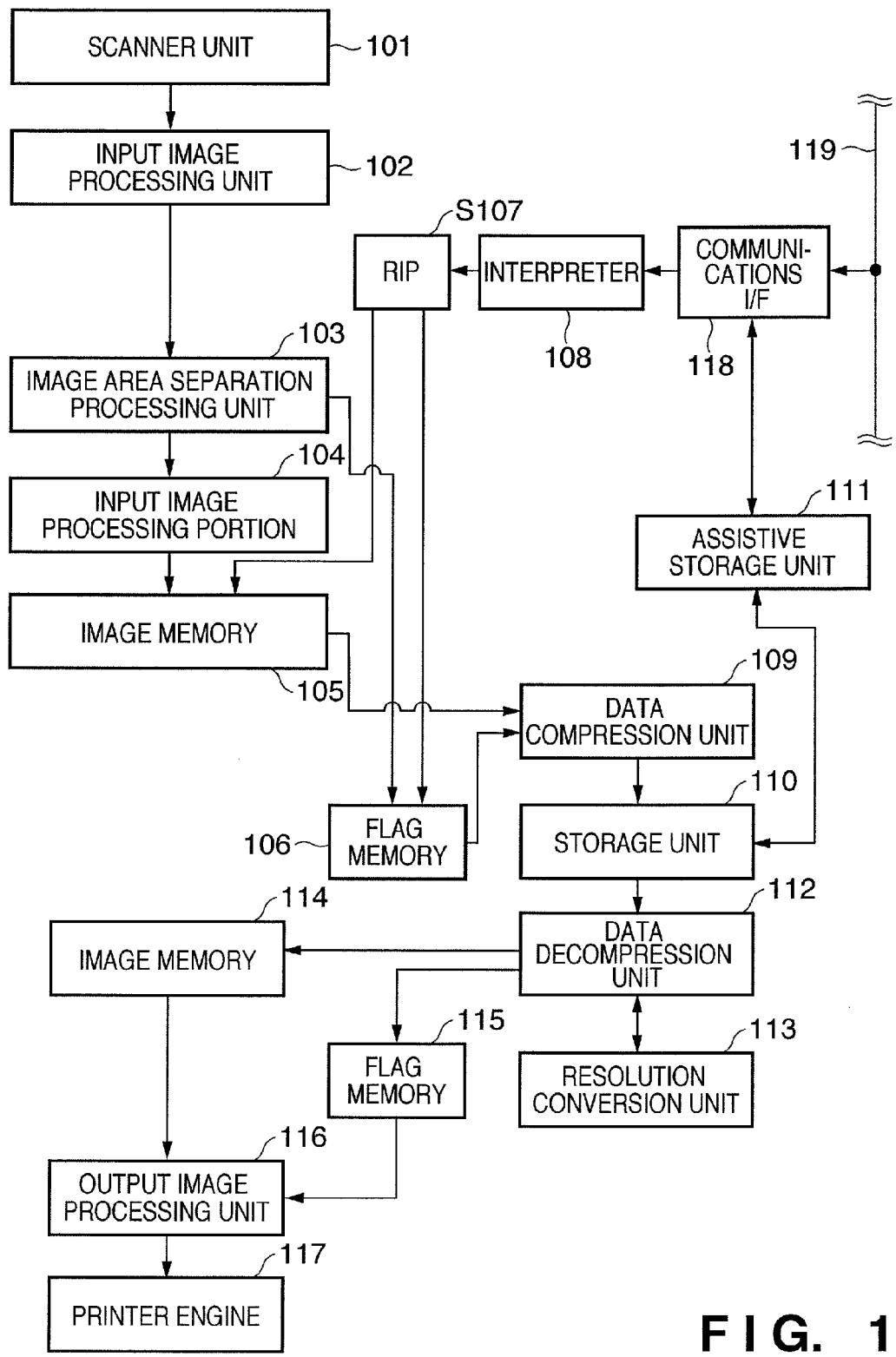
FIG. 1 is a block configuration diagram of an exemplary copier.

FIG. 1 is a block configuration diagram of an image processing apparatus according to the present embodiment. In the present embodiment, description is given of an example in which a copier (multifunction peripheral) also functions as a network printer. Below, a description is given of processing conducted by each unit in FIG. 1.

An operator loads a document to be copied into an ADF (auto document feeder) unit (not shown) of a scanner unit 101 and gives instruction on an operation unit (not shown) for commencement of copying. As a result, the ADF unit carries the document page by page onto a platen glass provided in the scanner unit 101 and reading is carried out. Using an RGB 3-line CCD for reading color images, the scanner unit 101 reads a document image and transfers this to an input image processing unit 102 as 8-bit RGB (256 gradations) digital data. The input image processing unit 102 carries out commonly known image processing techniques, such as shading correction, CCD interline correction, and color correction, on the RGB color image data sent from the scanner unit 101.

An image area separation processing unit 103 carries out image area separation processing on image processed color image signals output from the input image processing unit 102. The image area separation processing unit 103 detects image characteristics of photo (natural image) areas, character areas, and halftone dot areas for each pixel of the input image, then generates flag data indicating attributes of each image area and outputs this data to a flag memory 106.

Based on the flag data generated by the image area separation processing unit 103, an input image processing unit 104 carries out appropriate image processing for each image area and stores a result thereof in an image memory 105. For example, processing can be carried out of emphasizing high frequency components of the images for character areas to emphasize the sharpness of the characters, and so-called low pass filter processing for halftone dot areas to remove moire components that are peculiar to digital images. The switching of these processes is carried out on a per-pixel basis according to attribute flag data generated by the image area separation processing unit 103.

When one page of data is stored in the image memory 105 and the flag memory 106, these undergo compression coding in a data compression unit 109 and are then stored in a storage unit 110, respectively. This processing is carried out for all the documents loaded in the scanner unit 101. It should be noted that the data compression unit 109 performs encoding on the flag data using a lossless compression technique. JPEG, which is a lossy encoding technique, is used for the image data, but a lossless compression technique may be used.

Document reading processing is carried out and the storage unit 110 accumulates the image data and flag data of each document that is read. During this accumulation process, a data decompression unit 112 reads out the image data and flag data that have undergone compression coding by the storage unit 110 and carries out a decompression (decoding) process. At this time, resolution conversion of the image data is also carried out as necessary by a resolution conversion unit 113.

Decompressed image data is stored in an image memory 114 and decompressed flag data is stored in a flag memory 115. An output image processing unit 116 converts the image data that has been stored in the image memory 114 into recording color components C, M, Y, and Bk. Furthermore, the output image processing unit 116 carries out a process of reading out attribute information for each pixel from the flag memory 115 to generate image data for printing suited to each image area and outputs to a printer engine 117.

The foregoing description concerned a copying process but the apparatus of the present embodiment is connected to an external communications route (network) 119 and also functions as a network printer.

In this case, print data that has been received from an external PC or the like via a communications I/F 118 is supplied to an interpreter 108 and an assistive storage unit 111. The interpreter 108 interprets PDL commands of the received print data and converts these to internal drawing commands (intermediate data). A RIP (Raster Image Processor) 107 carries out a drawing process based on these drawing commands and outputs the result thereof to the image memory 105 and outputs flag data to the flag memory 106. PDL format print data defines characters, photos (natural images), and halftone dots and the like as print commands and therefore flag data can be obtained easily when drawing.

The foregoing was a description of a printing process according to the present embodiment. Next, more detailed description is given concerning the image area separation processing unit 103 according to the present embodiment.

Figure 2:
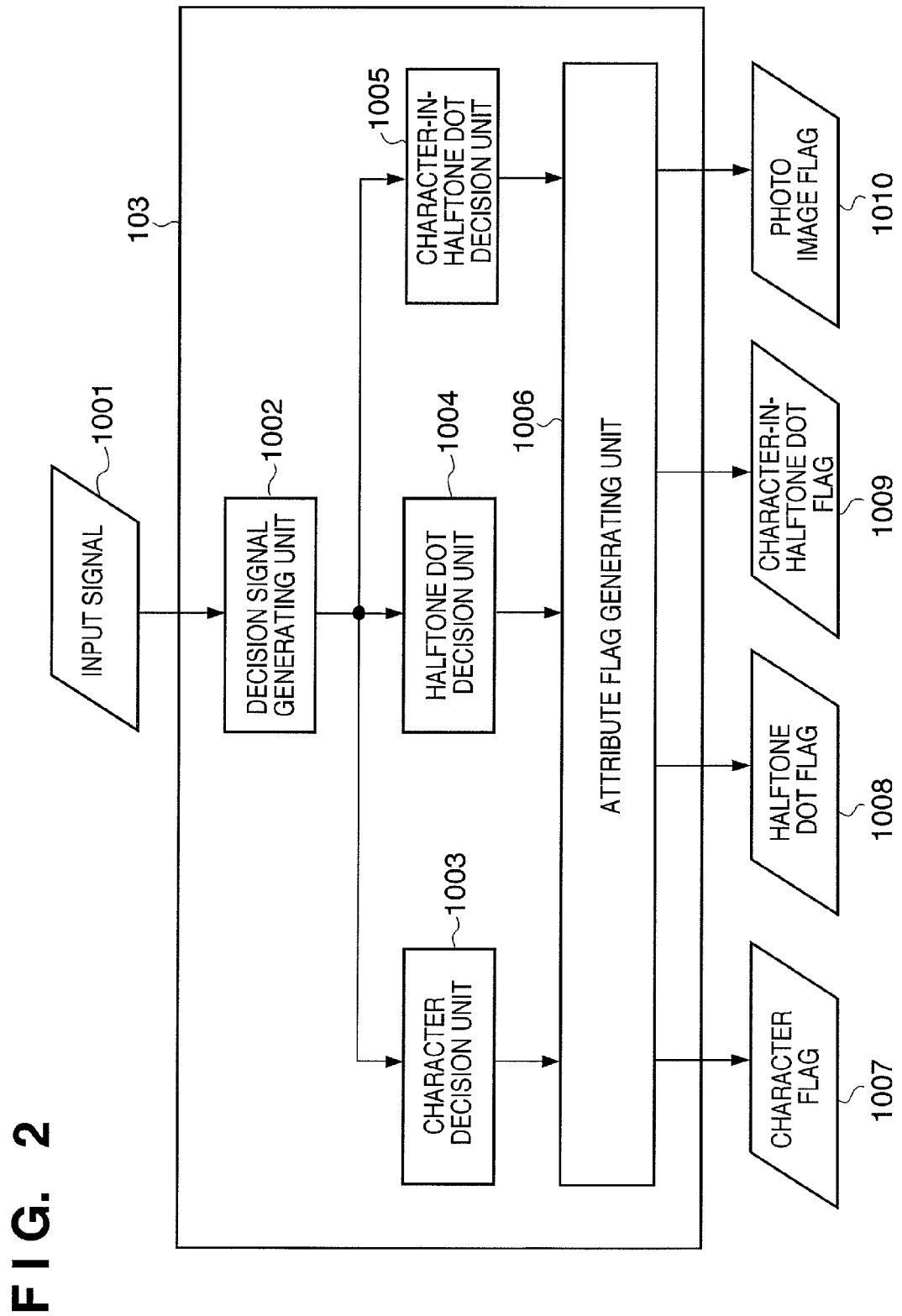
FIG. 2 is a block configuration diagram of an image area separation processing unit shown in FIG. 1.

FIG. 2 is a block configuration diagram of the image area separation processing unit 103 shown in FIG. 1.

A decision signal generating unit 1002 inputs an input signal 1001 from the input image processing unit 102 and generates a decision signal (data) for deciding attributes on a per-pixel basis. For example, when the input signals are RGB signals (8 bits each), a grayscale signal (8 bits) is generated. At this time, it is possible that only the G channel of RGB channels is drawn out and it is also possible that it is determined by a calculation such as (R+2×G+B)/4 or the like. Depending on the circumstances, the RGB color space may be converted to a Lab color space then the L channel thereof may be used. That is to say, the number of input signal channels and the number of bits are not limited to these. Also, in regard to decision signal generating methods, channel numbers, and bit numbers, the foregoing is merely an example.

The decision signals (luminance data) generated by the decision signal generating unit 1002 are supplied to a character decision unit 1003, a halftone dot decision unit 1004, and a character-in-halftone dot decision unit 1005, where character deciding, halftone dot deciding, and character-in-halftone dot deciding are respectively executed. An attribute flag generating unit 1006 performs a comparison calculation on decision results from the decision units 1003 to 1005 and generates attribute flags. For the present embodiment, description is given concerning generating a character flag 1007, a halftone dot flag 1008, a character-in-halftone dot flag 1009, and a photo image flag 1010. Based on these attribute flags, optimal image processing can be executed according to characteristics of the image contained in the document image. Below, detailed description is given concerning the character decision unit 1003, the halftone dot decision unit 1004, and the character-in-halftone dot decision unit 1005.

[Description of Character Decision Unit 1003]

Figure 3:
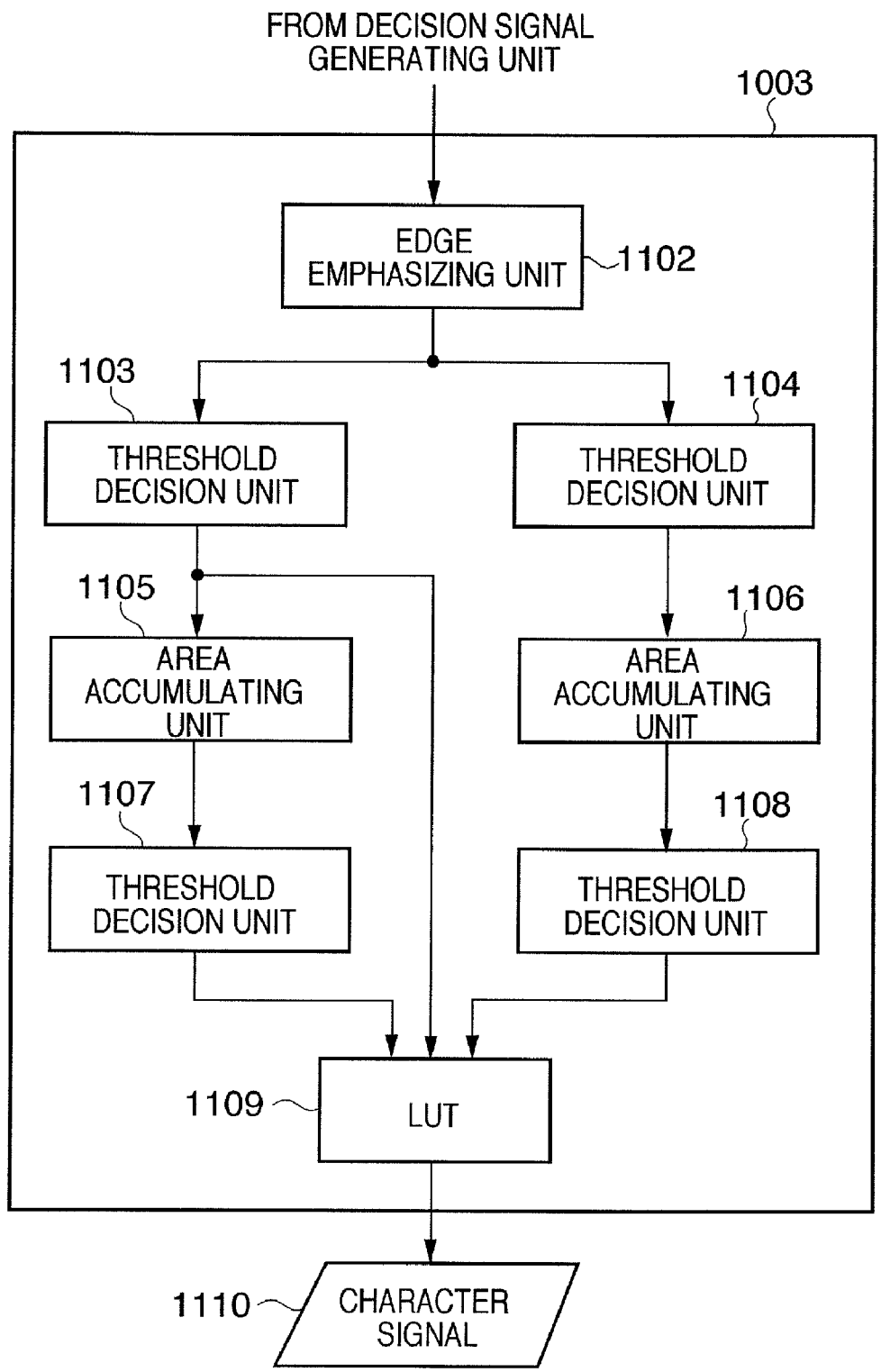
FIG. 3 is a block configuration diagram of a character decision unit shown in FIG. 2.

First, the character decision unit 1003 is described using FIG. 3. FIG. 3 is a block configuration diagram of the character decision unit 1003 according to the present embodiment.

An edge emphasizing unit 1102 carries out an edge emphasizing process on the decision signals from the decision signal generating unit 1002 and outputs edge emphasized data. In this edge emphasizing process, a digital filtering process is carried out by which predetermined frequency components of luminance data are emphasized and extracted. A typical example of this is a secondary differential filter or the like such as a Laplacian. Therefore, the edge emphasizing unit 1102 has a built-in buffer memory for storing multiple pixels.

The edge emphasized signals output from the edge emphasizing unit 1102 are input to a threshold decision unit 1103 and a threshold decision unit 1104 where secondary differential filter processing is executed. A positive value threshold is set in the threshold decision unit 1103 and a negative value threshold is set in the threshold decision unit 1104.

Figure 7A:
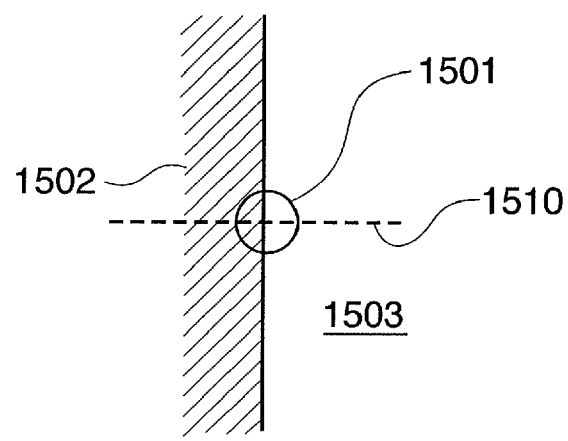
FIGS. 7A to 7C are diagrams illustrating processing of the character decision unit.

When using a secondary differential filter, the values after filtering have positive or negative signs. A case in which the image signals are luminance signals as in the present embodiment is described using FIGS. 7A to 7C. In FIG. 7A, an edge boundary area 1501 indicates a portion of a black character (character edge) on a white background 1503. Numeral 1502 indicates a character inside area. Viewing a section 1510 of the edge boundary area 1501 as a signal level gives an image signal 1504 shown in FIG. 7B. The character inside area 1502 is a dark area and therefore the signal level is low (1505). The background 1503 is a bright area and therefore the signal level is high (1506). The image signal 1504 subjected to digital filtering process using a secondary differential filter becomes an edge extraction signal 1507 shown in FIG. 7C. The value of the edge extraction signal 1507 on the character inside area 1502 side takes a positive value and that on the background 1503 side takes a negative value. Thus, an inside edge signal (a signal indicating that a pixel of interest is inside a character edge (1508)) is output from the threshold decision unit 1103 when the positive threshold is exceeded. On the other hand, an outside edge signal (a signal indicating that a pixel of interest is outside a character edge (1509)) is output from the threshold decision unit 1104 when the signal value is below the negative threshold.

The inside edge signal output from the threshold decision unit 1103 is supplied to an area accumulating unit 1105 and the outside edge signal output from the threshold decision unit 1104 is supplied to an area accumulating unit 1106. For example, the area accumulating units 1105 and 1106 add decision signals of pixels of a 3×3 area around and including pixels of interest constituted of a 3×3 size. In this case, the values output from the area accumulating units 1105 and 1106 are in a range of 0 to 9.

Threshold decision units 1107 and 1108 output decision results by comparing output results of the area accumulating units 1105 and 1106 with a threshold. For example, when a value of "2" is set for the thresholds respectively, the threshold decision unit 1107 outputs a "1" decision signal "when there are two or more pixels determined to be inside the edge within the surrounding 3×3 area." Similarly, the threshold decision unit 1108 outputs a "1" decision signal "when there are two or more pixels determined to be outside the edge within the surrounding 3×3 area." An example of the foregoing decision processing is described using FIGS. 5A to 5F. FIG. 5A shows a character edge portion 1301 on a white background.

An area 1302 in FIG. 5B shows a result (outside edge) obtained by the input signal having undergone edge emphasizing by the edge emphasizing unit 1102 and a threshold decision by the threshold decision unit 1104. As shown in the diagram, the area 1302 indicates an outside area of the character edge.

An area 1304 in FIG. 5C shows an area accumulation result of the outside edge obtained by processing the outside edge area 1302 with the area accumulating unit 1106 and performing a threshold decision with the threshold decision unit 1108. As shown in the diagram, it is evident that the area 1304 is a result of the outside edge area 1302 being expanded.

An area 1303 in FIG. 5D shows the inside edge area as a result obtained by processing the input signal 1301 with the edge emphasizing unit 1102 and performing a threshold decision with the threshold decision unit 1103. As exemplified in the diagram, the inside edge area 1303 indicates an inside area of the character edge 1301.

An area 1305 in FIG. 5E shows an area accumulation of the inside edge area obtained by processing the inside edge signal 1303 with the area accumulating unit 1105 and a performing a threshold decision with the threshold decision unit 1107. As exemplified in the diagram, it is evident that the area 1305 is a result of the inside edge signal 1303 being expanded.

An LUT (look-up table) 1109 inputs signals (3 bits) of the threshold decision units 1103, 1107, and 1108 and generates signals indicating whether or not these are character edges. An area 1306 in FIG. 5F shows a character edge area.

The LUT 1109 performs a role in outputting decision results in accordance with logic that is determined based on output results of the respective threshold decisions. For example, there are the following conditions.

Pixel of interest is inside edge.→1
Other than above, two or more outside edges present in 5×5 area around pixels of interest.→0
Other than above, two or more inside edges present in 5×5 area around pixels of interest.→1
None of the above apply.→0

To achieve the above, the LUT 1109 should hold a table such as the one in FIG. 6. As exemplified in the diagram, character edge decisions are decided in response to results of an inputted inside edge decision, an area accumulation decision of the inside edge decision, and an area accumulation decision of the outside edge decision. By performing decisions in the above manner, character edges can be suitably extracted. A character signal 1110 is generated based on the LUT and the decisions of the decision units.

[Description of Halftone Dot Decision Unit 1004]

Figure 4:
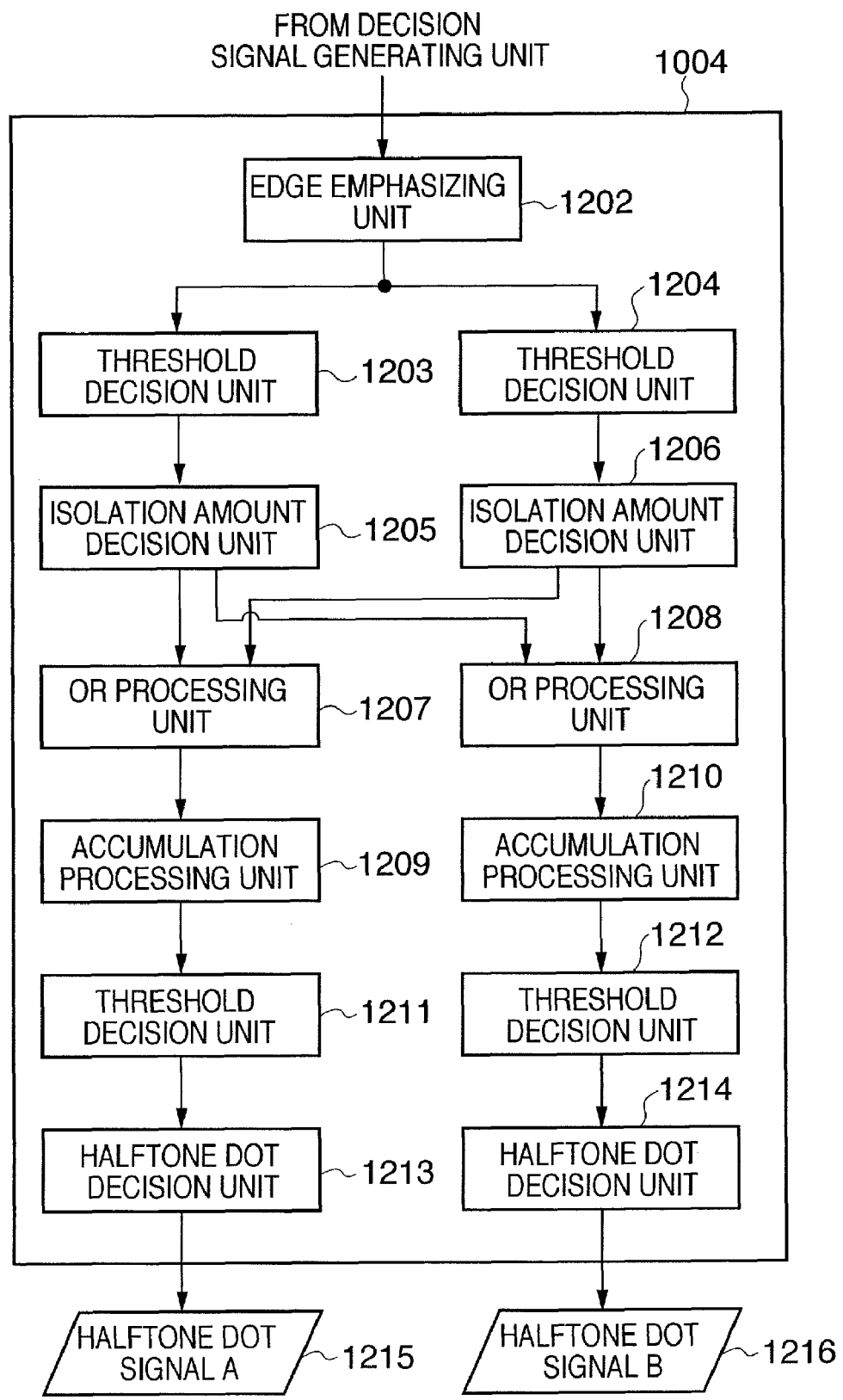
FIG. 4 is a block configuration diagram of a halftone dot decision unit shown in FIG. 2.

Next, description is given of the halftone dot decision unit 1004 according to the present embodiment. FIG. 4 is a block configuration diagram of the halftone dot decision unit 1004 according to the present embodiment.

An edge emphasizing unit 1202 inputs a decision signal (luminance data in the present embodiment) from the decision signal generating unit 1002 and carries out an edge emphasizing process. Here, a digital filtering process is carried out by which predetermined frequency components of the image data are emphasized and extracted. A typical example of this is a secondary differential filter or the like such a Laplacian.

The edge emphasized signals output from the edge emphasizing unit 1202 are supplied to a threshold decision unit 1203 and a threshold decision unit 1204 where secondary differential filter processing is carried out. A positive value threshold is set in the threshold decision unit 1203 and a negative value threshold is set in the threshold decision unit 1204.

Figure 8A:
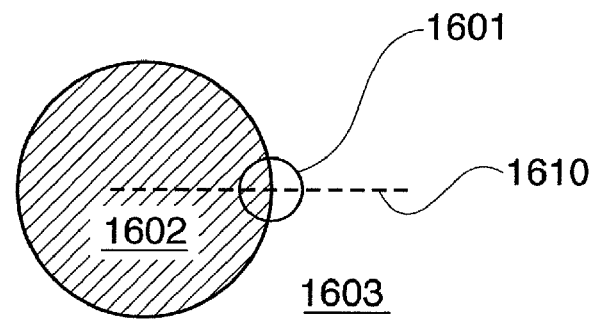
FIGS. 8A to 8C are diagrams illustrating processing of the halftone dot decision unit.
Figure 8B:
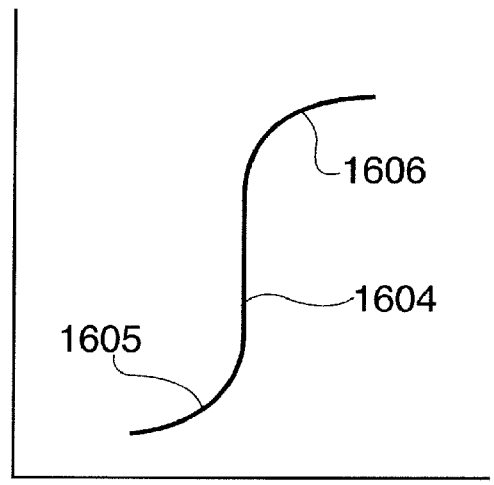
Figure 8C:
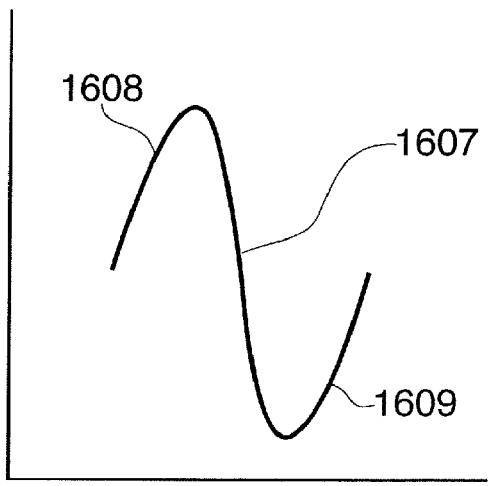

When using a secondary differential filter, the filtered signal values have positive or negative signs, and these are shown in FIGS. 8A to 8C for a case in which the image signals are luminance signals as in the present embodiment. When interest is given to a single halftone dot, an edge boundary area 1601 of that halftone dot indicates a portion (a halftone dot edge) of the halftone dot in a white background 1603. Numeral 1602 indicates a halftone dot. Viewing a section 1610 of the halftone dot edge boundary area 1601 as a signal level gives an image signal 1604. The halftone dot 1602 is a dark area and therefore the signal level is low (1605). The background 1603 is a bright area and therefore the signal level is high (1606). The image signal 1604 subjected to digital filtering process using a secondary differential filter becomes a halftone dot edge extraction signal 1607. The value of the halftone dot edge extraction signal 1607 on the halftone dot 1602 side takes a positive value 1608 and that on the background 1603 side takes a negative value 1609. Thus, an inside edge signal is output from the threshold decision unit 1203 that is decided when the positive threshold is exceeded and an outside edge signal is output from the threshold decision unit 1204 that is decided when the signal value is below the negative threshold.

The inside edge signal output from the threshold decision unit 1203 is input to an isolation amount decision unit 1205. The outside edge signal output from the threshold decision unit 1204 is input to an isolation amount decision unit 1206.

The isolation amount decision unit 1205 carries out a pattern matching process on the inside edge signals from the threshold decision unit 1203. Halftone dot documents range from low screen frequencies to high screen frequencies and therefore the sizes and intervals of the halftone dots vary depending on the document. For this reason, pattern matching is carried out using a plurality of patterns so as to be able to detect halftone dots of any kind of screen frequency. For halftone dots of a low screen frequency, pattern matching is carried out using large patterns to detect whether or not there is a halftone dot. For halftone dots of a high screen frequency, pattern matching is carried out using small patterns to detect whether or not there is a halftone dot. Furthermore, the shape of halftone dots changes depending on their luminance, and therefore levels are applied in the matching so as to be able to handle this.

An example of pattern matching is described using FIGS. 9A and 9B. FIG. 9A shows an example of a result from the threshold decision unit 1203. Description is given of an example in which pattern matching is performed for 4×4 pixels 1700, and therefore an inside edge signal 1701 of the 4×4 area is extracted. Therein, pixels output by the threshold decision unit 1203 as HIGH inside edge signals are 4 pixels (black pixels) of an area 1702 shown in the diagram. The remaining pixels are pixels of LOW inside edge signals (1703). And the pixel of interest is a pixel 1701.

Next, an example of a same size pattern is shown in FIG. 9B. In a pattern 1710 of this diagram, a black pixel 1712 is a pixel for a pattern HIGH. A white pixel 1713 is a pixel for a pattern LOW. A slanting line pixel 1714 is a pixel in which either is acceptable ("don't care," hereinafter referred to as "DC"). With this as a basic pattern, decision levels are adjusted by applying levels to the extent of pattern matching for each of the black pixel 1712 and the white pixel 1713. And the pixel of interest is a pixel 1711.

FIGS. 10A to 10D show an example of pattern matching between the inside edge signal 1700, which is a result of the threshold decision, and the pattern 1710 of the isolation amount decision.

In the isolation amount decision pattern 1710, when three or more pixels of a pattern HIGH (1712) of 4 pixels are matching, the pattern HIGH is valid. When 6 or more pixels of a pattern LOW (1713) of 8 pixels are matching, the pattern LOW is valid. The isolation amount decision result of the pixel of interest 1801 is HIGH only when both the pattern HIGH and the pattern LOW are valid.

Figure 10A:
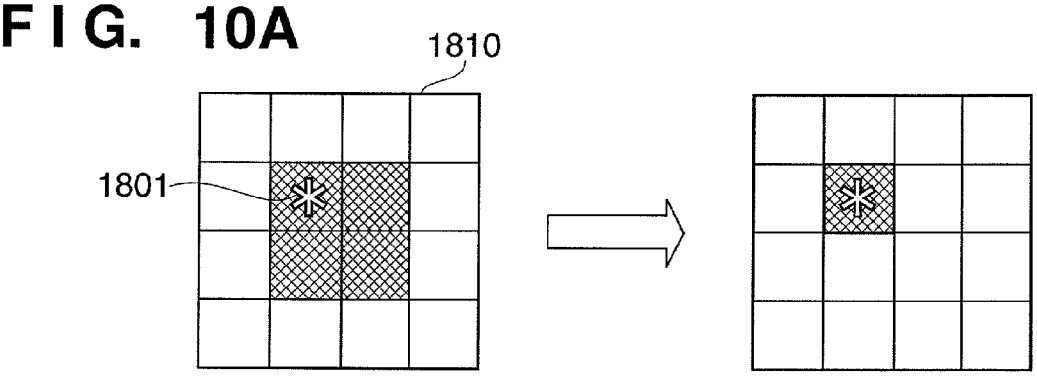
FIGS. 10A to 10D show examples of a pattern matching process of the halftone dot decision unit.

As a result of the foregoing, in the case of an inside edge signal 1810 of FIG. 10A, including a pixel of interest 1801, since 4 pixels are pattern HIGH and 8 pixels are pattern LOW, both are valid and as a result the isolation amount decision signal becomes HIGH.

Figure 10B:
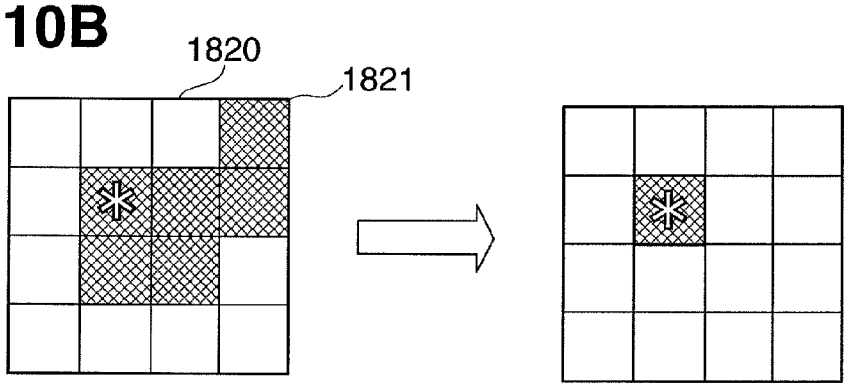

In the case of an inside edge signal 1820 of FIG. 10B, since 4 pixels are pattern HIGH and 7 pixels are pattern LOW, both are valid and as a result the isolation amount decision signal becomes HIGH. It should be noted that a pixel 1821 is "don't care," and therefore does not influence the decision.

Figure 10C:
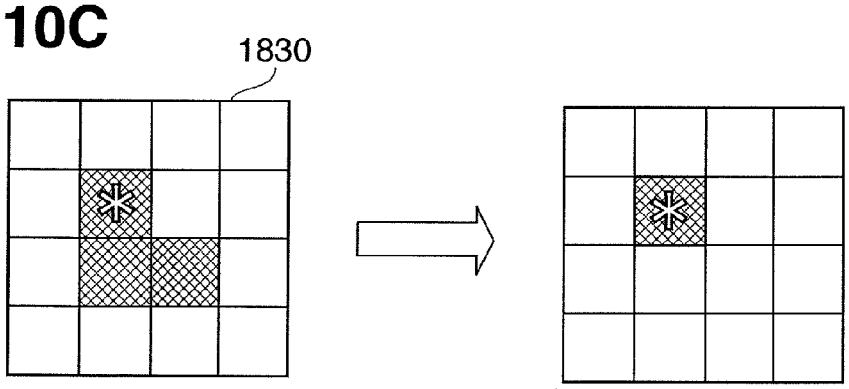

In the case of an inside edge signal 1830 of FIG. 10C, since 3 pixels are pattern HIGH and 8 pixels are pattern LOW, both are valid and as a result the isolation amount decision signal becomes HIGH.

Figure 10D:
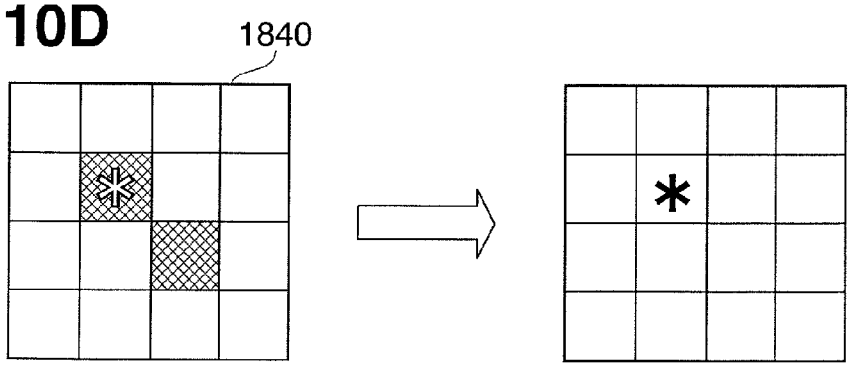

And in the case of an inside edge signal 1840 of FIG. 10D, since 2 pixels are pattern HIGH and 8 pixels are pattern LOW, pattern LOW is valid and pattern HIGH is invalid, and therefore the isolation amount decision signal becomes LOW.

Pattern matching is carried out in this manner using patterns of a plurality of sizes. The present embodiment was described in regard to inside edge signals, but the same pattern matching is also carried out in regard to the outside edge signals. In this case, patterns and decision level adjustment values can be set arbitrarily.

Next, the isolation amount decision signals output from the isolation amount decision units 1205 and 1206 are supplied to OR processing units 1207 and 1208. At the OR processing units 1207 and 1208, an OR is obtained of the HIGH/LOW of the isolation amount decision signals within a 3×3 area, and the pixel of interest is set to HIGH if even one pixel is HIGH. A specific example is described using FIGS. 11A to 11C.

Figure 11A:
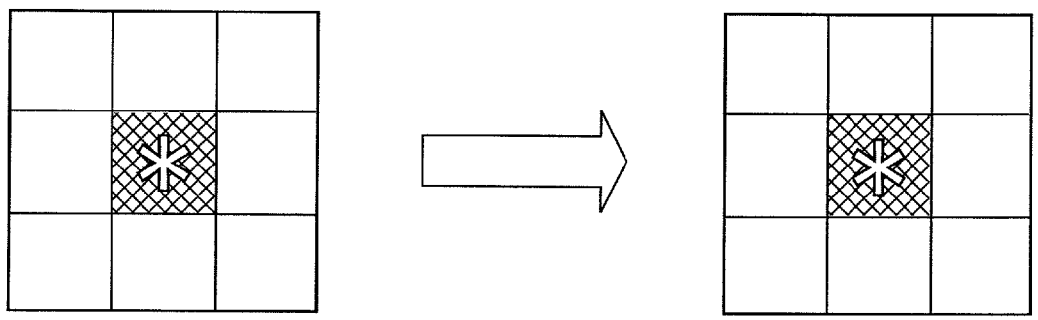
FIGS. 11A to 11C show examples of a pattern matching process of the halftone dot decision unit.
Figure 11B:
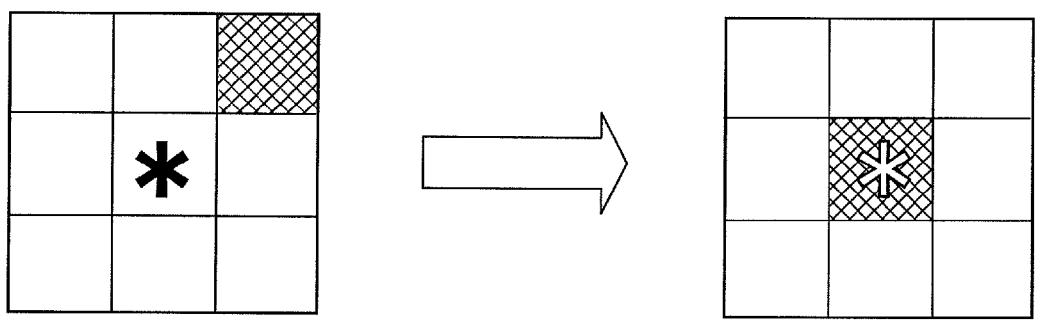
Figure 11C:
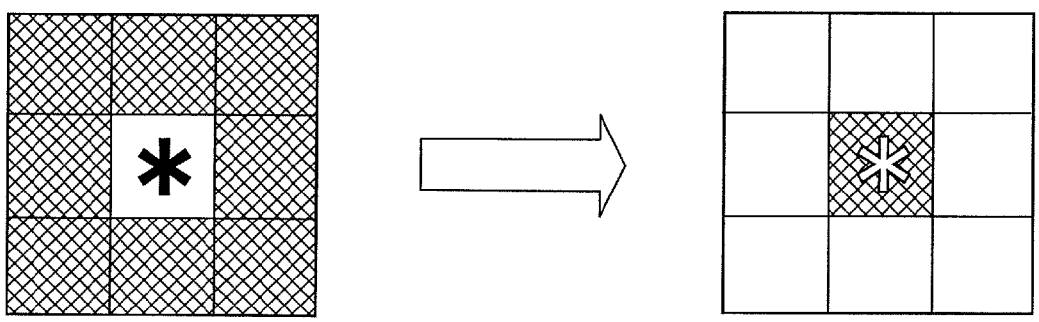

FIG. 11A shows a case where the isolation amount decision signal of only the pixel of interest in the center of the 3×3 area is HIGH. Accordingly, after OR processing, the pixel of interest is left as it is as HIGH. In FIG. 11B, the pixel of interest of the 3×3 area is LOW, but since there is a HIGH pixel within the 3×3 area, the pixel of interest becomes HIGH after OR processing. In FIG. 1C, only the pixel of interest of the 3×3 area is LOW, but since there are HIGH pixels within the 3×3 area, the pixel of interest becomes HIGH after OR processing.

Signals resulting from processing by the OR processing units 1207 and 1208 are supplied to accumulation processing units 1209 and 1210. Accumulation signals that have undergone accumulation processing pass through threshold decision units 1211 and 1212 then through halftone dot decision units 1213 and 1214 and are output as a halftone dot signal A (1215) and a halftone dot signal B (1216). This process is described using FIG. 12.

Figure 12:
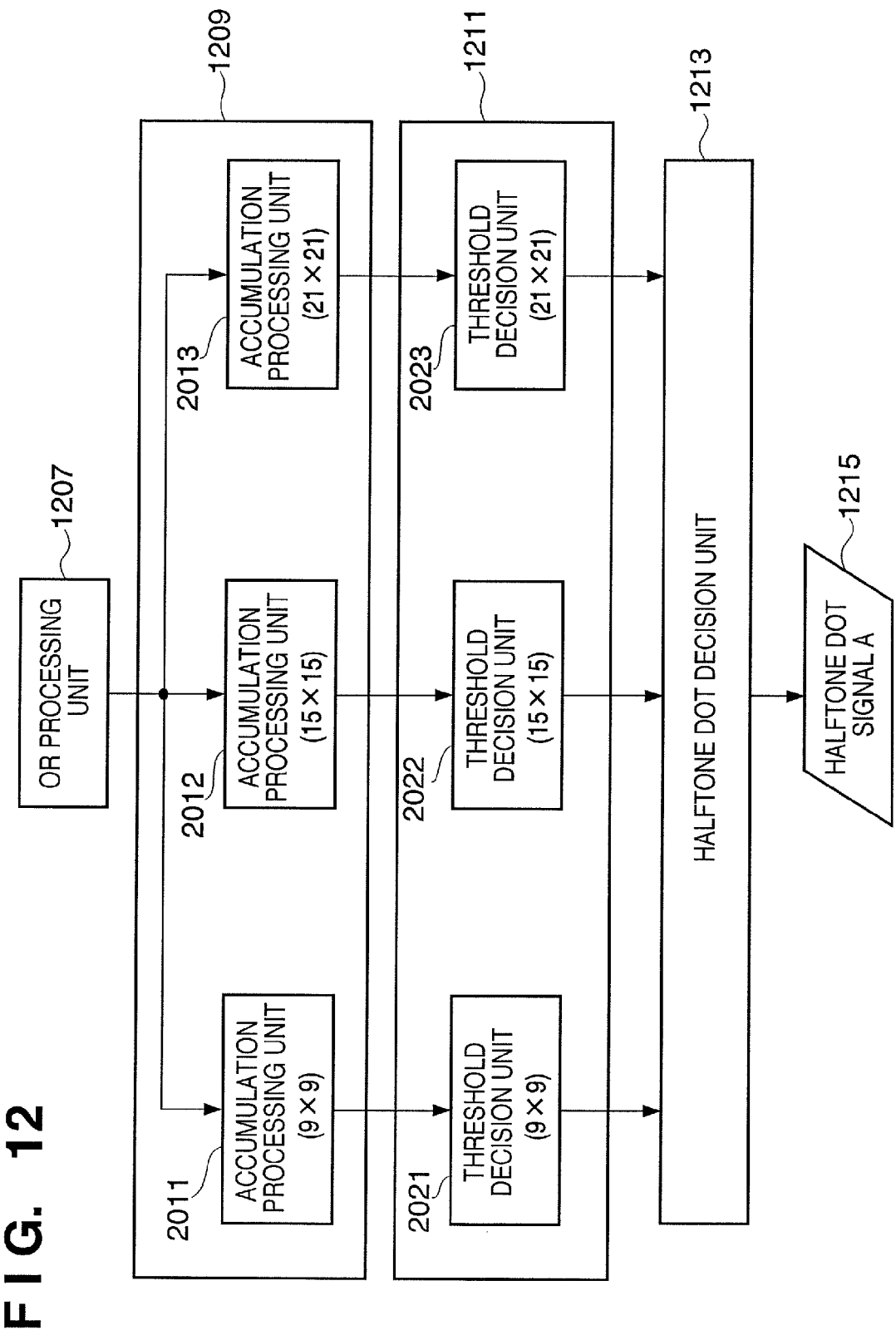
FIG. 12 shows an example of a specific configuration pertaining to halftone dot decisions by the halftone dot decision unit.

FIG. 12 shows a specific example of the OR processing unit 1207, the accumulation processing unit 1209, the threshold decision unit 1211, and the halftone dot decision unit 1213. A configuration involving the OR processing unit 1208, the accumulation processing unit 1210, the threshold decision unit 1212, and the halftone dot decision unit 1214 is essentially equivalent and therefore description thereof is not included. It should be noted that "M×N" in parentheses after each processing unit indicates an area size targeted for processing by that processing unit.

Signals that have undergone OR processing by the OR processing unit 1207 are accumulated using a plurality of areas. For example, an accumulation processing unit 2011 accumulates in a 9×9 area signals that have become HIGH after OR processing. Accordingly, output values of the accumulation processing unit 2011 are in a range of 0 to 81. This is the same for an accumulation processing unit 2012 and an accumulation processing unit 2013 (except that the areas may be of different sizes, e.g., 15×15 and 21×21 in the example shown in FIG. 12).

Next, the accumulated signals from accumulation processing unit 2011, accumulation processing unit 2012 and accumulation processing unit 2013 undergo corresponding processing in a threshold decision unit 2021, a threshold decision unit 2022, and a threshold decision unit 2023, respectively. These thresholds are set to a different value for each respective threshold decision.

Based on the signals output from the respective threshold decision units, a halftone dot decision unit 1213 carries out decisions as to whether or not there is a halftone dot and outputs a halftone dot signal A (1215). A more specific example is described using FIGS. 13A to 13C.

Figure 13A:
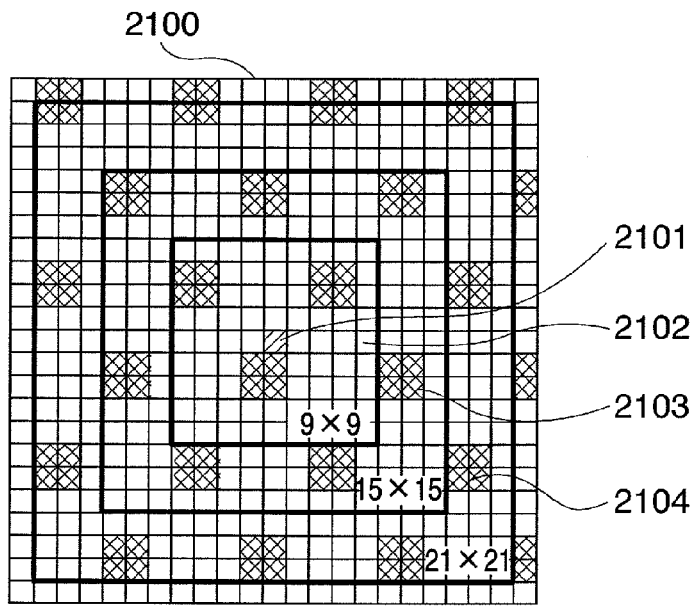
FIGS. 13A to 13C show one example of a process of the halftone dot decision unit.

Numeral 2100 in FIG. 13A indicates OR signals in a low luminance halftone dot area that have undergone OR processing. For black pixels it is indicated that the OR signal is HIGH and for white pixels it is indicated that the OR signal is LOW. These signals are accumulated in a plurality of different areas. Three types of areas are described here to facilitate description, but there is no limitation to three types. For each of a 9×9 area 2102, a 15×15 area 2103, and a 21×21 area 2104, which are centered on a pixel of interest 2101, the accumulation processing units 2011, 2012, and 2013 accumulate (add) numbers of pixels whose OR signal is HIGH within the 9×9 area, the 15×15 area, and the 21×21 area.

Figure 13B:
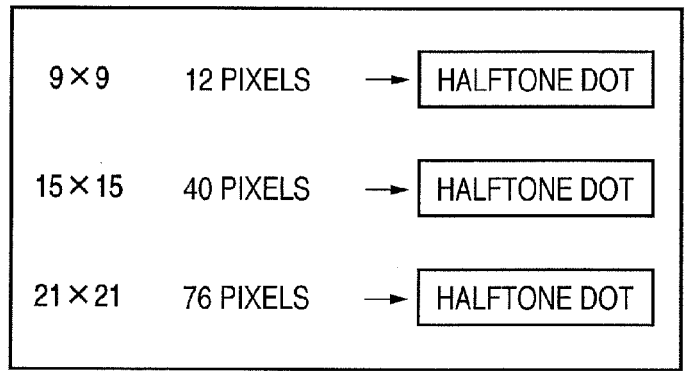

FIG. 13B shows these respective accumulation results. The accumulation result of the accumulation processing unit 2011 is 12 pixels. The accumulation result of the accumulation processing unit 2012 is 40 pixels. The accumulation result of the accumulation processing unit 2013 is 76 pixels.

At this time, if it is assumed that a halftone dot is set when HIGH signals within an area exceed 5%, and a halftone dot is not set for 5% or lower, the threshold settings to the threshold decision unit 1213 are as follows.

Threshold for the accumulation processing unit 2011 is "5,"

Threshold for the accumulation processing unit 2012 is "12," and

Threshold for the accumulation processing unit 2013 is "23."

In the case of FIG. 13A, the accumulation result "12" of the accumulation processing unit 2011 is above the threshold "5" and therefore it is decided that the pixel of interest is a halftone dot area. Similarly, the accumulation result "40" of the accumulation processing unit 2012 exceeds the threshold "12" and the accumulation result "76" of the accumulation processing unit 2013 also exceeds the threshold "23," and therefore a decision of halftone dot is made.

Figure 13C:
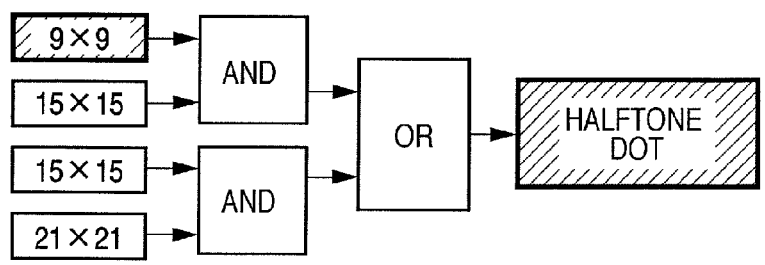

Next, based on the aforementioned three types of results, a decision is made as to whether or not the pixel of interest is to be a halftone dot. For example, as shown in FIG. 13C, pairs of two groups are formed from the results of the three types. For example, one group is obtained by the accumulation results from the accumulation processing unit 2011 and the accumulation processing unit 2012 and another group is obtained from the accumulation results from the accumulation processing unit 2012 and the accumulation processing unit 2013. Then, a logical product is taken within the respective groups. The logical product of the accumulation results of the accumulation processing unit 2011 and the accumulation processing unit 2012 decides a halftone dot. The logical product of the accumulation results of the accumulation processing unit 2012 and the accumulation processing unit 2013 decides a halftone dot. Further still, a logical sum is determined of the results of the two logical products obtained in this manner. Since the results of the logical products are both for halftone dots in the foregoing case, the logical sum is also for a halftone dot, and finally it is decided that the pixel of interest is in a halftone dot area.

Figure 14A:
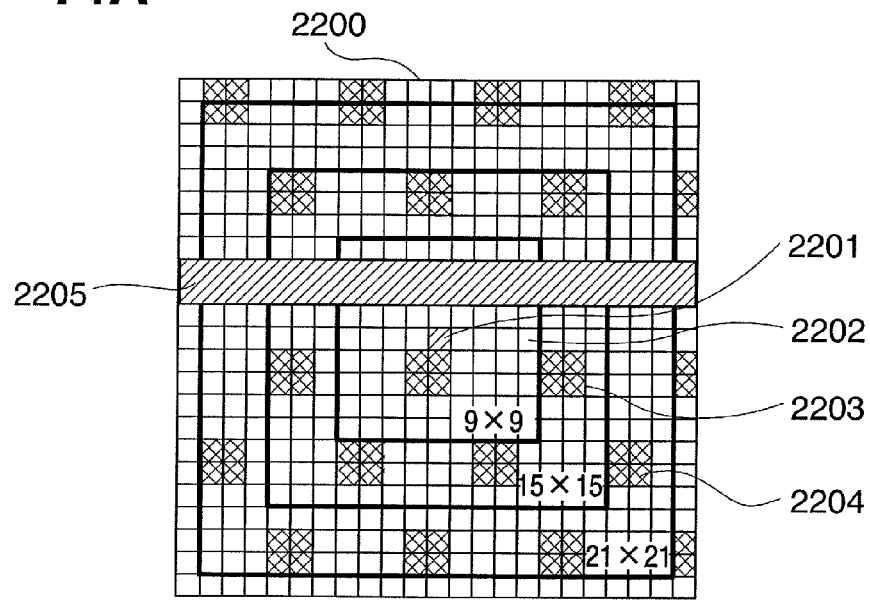
FIGS. 14A to 14C show one example of a process of the halftone dot decision unit.
Figure 14B:
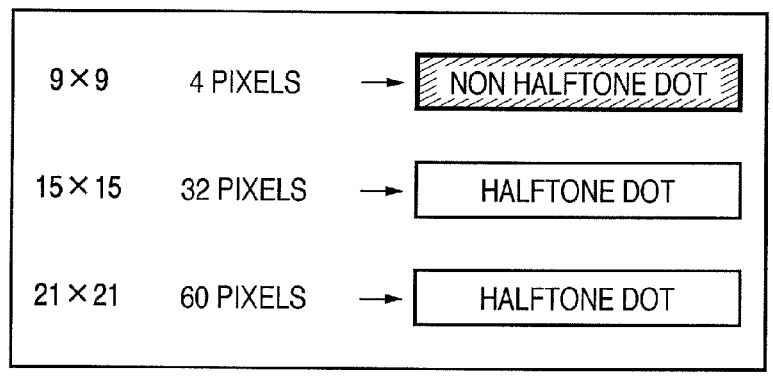
Figure 14C:
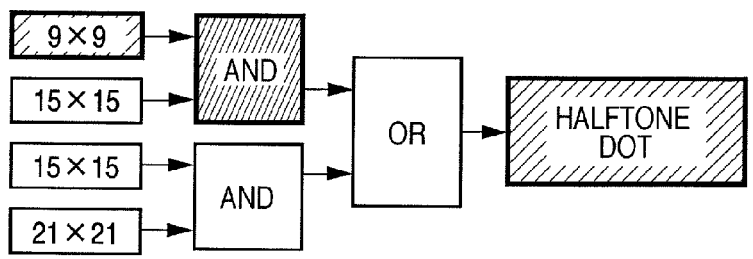

Description is given using FIGS. 14A to 14C of a case where there is a character edge within a low luminance halftone dot area.

An area 2200 in FIG. 14A indicates OR signals in a low luminance halftone dot area that have undergone OR processing. For black pixels it is indicated that the OR signal is HIGH and for white pixels it is indicated that the OR signal is LOW. When there is a character edge 2205 as shown in the diagram, no isolation point occurs in the vicinity of the character edge and therefore the OR signals of the character edge vicinity are LOW. In this state, these signals are accumulated in a plurality of different areas. The accumulation processing unit 2011, the accumulation processing unit 2012, and the accumulation processing unit 2013 accumulate numbers of pixels whose OR signal is HIGH for each of a 9×9 area 2202, a 15×15 area 2203, and a 21×21 area 2204, which are centered on a pixel of interest 2201.

Respective accumulation results are as shown in FIG. 14B. The accumulation result of the accumulation processing unit 2011 is "4," The accumulation result of the accumulation processing unit 2012 is "32," and the accumulation result of the accumulation processing unit 2013 is "60." When each of the thresholds is set having the same conditions as earlier, the accumulation value "4" of the accumulation processing unit 2011 is under the threshold "5" and therefore the pixel of interest is decided as non halftone dot. Furthermore, the accumulation value "32" of the accumulation processing unit 2012 is not less than the threshold "12" and therefore the pixel of interest is decided as a halftone dot. And the accumulation value "60" of the accumulation processing unit 2013 is not less than the threshold "23" and therefore the pixel of interest is likewise decided as a halftone dot. FIG. 14B shows these decision results.

Next, as shown in FIG. 14C, based on the aforementioned three types of decision results, a decision is made as to whether or not the pixel of interest is to be a halftone dot. As before, pairs of two groups are formed from the results of the three types. A logical product is obtained for each of one group of decision results of the accumulation processing unit 2011 and the accumulation processing unit 2012 and another group of decision results of the accumulation processing unit 2012 and the accumulation processing unit 2013. With the logical product of decision results based on the accumulation results from the accumulation processing unit 2011 and the accumulation processing unit 2012, a decision is made of non halftone dot. With the logical product of decision results based on the accumulation results from the accumulation processing unit 2012 and the accumulation processing unit 2013, halftone dot is decided. Further still, a logical sum is determined of the results of the two logical products. In the foregoing case, one decision is non halftone dot and another decision is halftone dot, and therefore the logical sum is halftone dot and the result of the halftone dot decision is halftone dot. In this way, detection of halftone dots can be achieved using a plurality of areas and a plurality of thresholds.

Figure 15A:
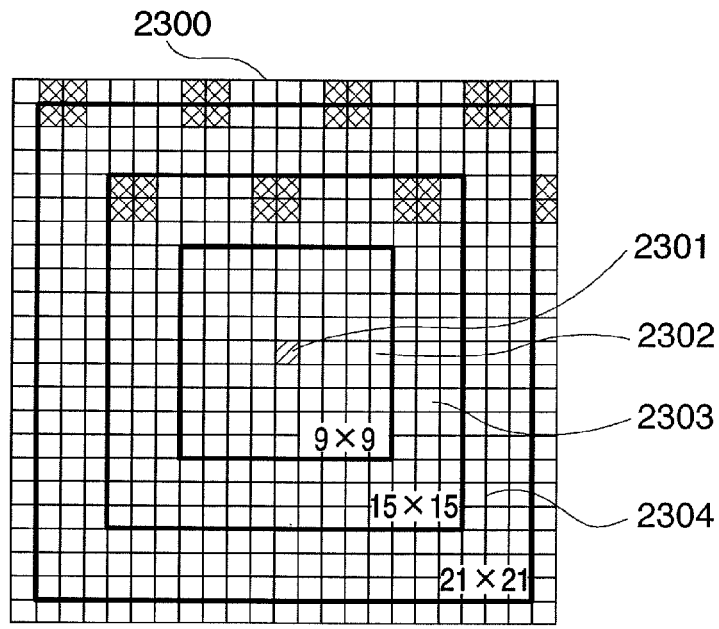
FIGS. 15A to 15C show one example of a process of the halftone dot decision unit.
Figure 15B:
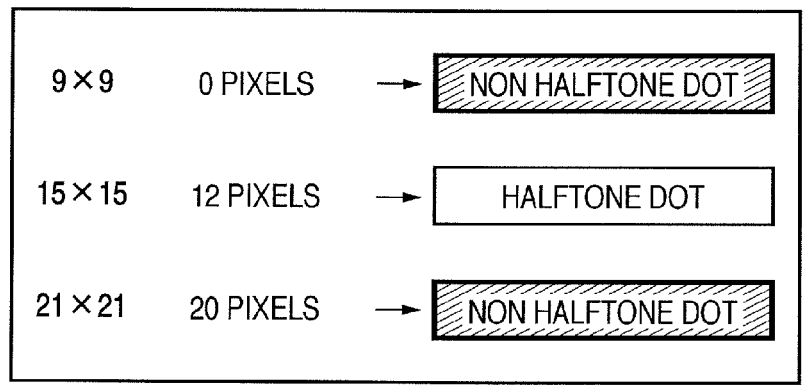
Figure 15C:
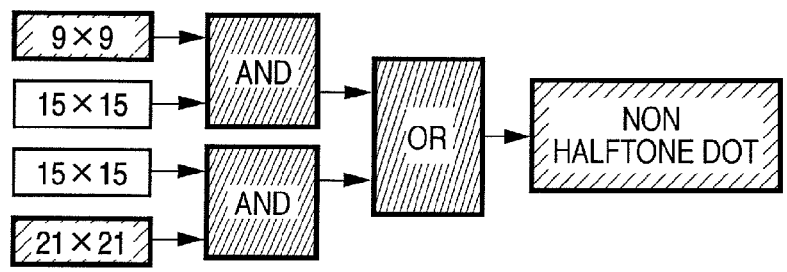

Next, description is given using FIGS. 15A to 15C of a case where there is a pixel of interest outside an edge of a low luminance halftone dot area.

An area 2300 in FIG. 15A indicates OR signals in a low luminance halftone dot area that have undergone OR processing. For black pixels it is indicated that the OR signal is HIGH and for white pixels it is indicated that the OR signal is LOW. In this state, these signals are accumulated in a plurality of different areas. FIG. 15B shows results of accumulating numbers of pixels whose OR signal is HIGH for each of a 9×9 area 2302, a 15×15 area 2303, and a 21×21 area 2304, which are centered on a pixel of interest 2301.

The accumulation result of the accumulation processing unit 2011 for area 2302 is "0," The accumulation result of the accumulation processing unit 2012 for area 2303 is "12," and the accumulation result of the accumulation processing unit 2013 for area 2304 is "20."

When each of the thresholds is set having the same conditions as earlier, the accumulation value "0" of the accumulation processing unit 2011 is under the threshold "5" and therefore the pixel of interest is decided as non halftone dot. The accumulation value "12" of the accumulation processing unit 2012 is equivalent to the threshold "12" and therefore the pixel of interest is decided as a halftone dot. And the accumulation value "20" of the accumulation processing unit 2013 is below the threshold "23" and therefore the pixel of interest is decided as non halftone dot. FIG. 15B shows these decision results.

Next, based on the aforementioned three types of results, a decision is made as to whether or not the pixel of interest is to be a halftone dot. As shown in FIG. 15C, pairs of two groups are formed from the results of the three types. For example, a logical product is obtained for each of one group of decision results of accumulation values of the accumulation processing unit 2011 and the accumulation processing unit 2012 and for another group of decision results of accumulation values of the accumulation processing unit 2012 and the accumulation processing unit 2013. With the logical product of the decision results of the accumulation values of the accumulation processing unit 2011 and the accumulation processing unit 2012, a decision is made of non halftone dot. And also with the logical product of the decision results of the accumulation values of the accumulation processing unit 2012 and the accumulation processing unit 2013, a decision is made of non halftone dot. Further still, a logical sum is determined of the results of the two logical products. In the foregoing case, both results of the logical products are for non halftone dot and therefore the logical sum is also for no halftone dot and the result of the halftone dot decision is non halftone dot. As a result, there is no occurrence of fattening in the halftone dot signal, which occurred conventionally when the accumulation area was enlarged to improve the accuracy of the decisions. This enables the outside of edges of halftone dots to be detected as non halftone dots using a plurality of areas and a plurality of thresholds.

The combination of accumulation processes described here is merely one example and there is no limitation to this. Combinations can be configured freely according to purpose. Furthermore, the description used logical products of two groups because three types of results of accumulation processes are used, but there is no limitation to this. The number of inputs and the logical calculation units thereof can be configured freely. Moreover, the combination of logical products and logical sums is merely one example and there is no limitation to this. Logical products and logical sums can be combined freely.

[Description of Character-in-Halftone Dot Decision Unit 1005]

Figure 16:
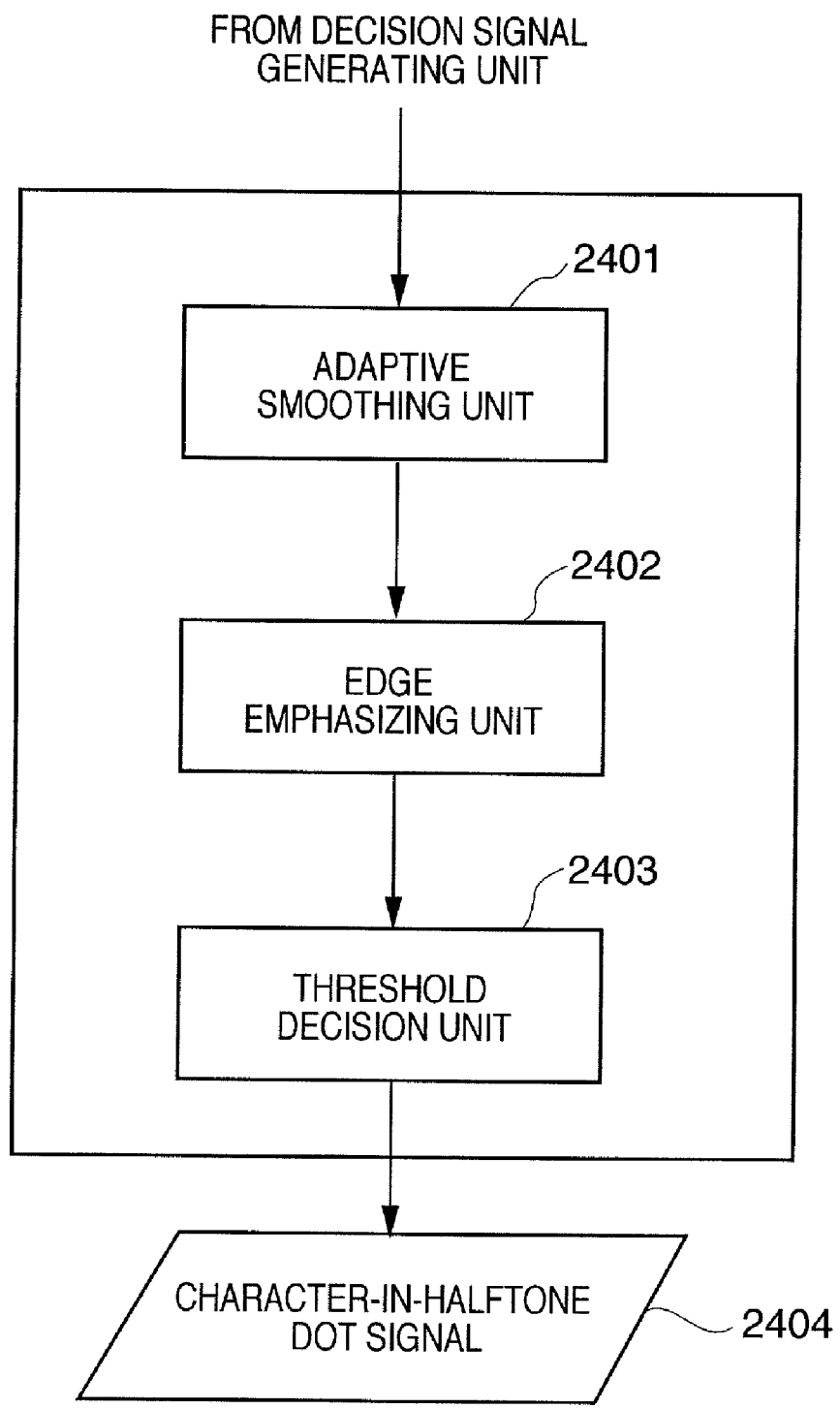
FIG. 16 is a block configuration diagram of a character-in-halftone dot decision unit shown in FIG. 2.

FIG. 16 is a block configuration diagram of the character-in-halftone dot decision unit 1005 according to the present embodiment.

An adaptive smoothing unit 2401 receives decision signals from the decision signal generating unit 1002 and carries out an adaptive smoothing process. Here, a digital filtering process is carried out by which predetermined frequency components of the image data are smoothed while characters/fine lines are excluded adaptively.

Smoothing signals output from the adaptive smoothing unit 2401 undergo an edge emphasizing process at an edge emphasizing unit 2402. Here, a digital filtering process is carried out by which predetermined frequency components of the image data are emphasized and extracted. A typical example of this is a secondary differential filter or the like such as a Laplacian.

Edge emphasized signals output from the edge emphasizing unit 2402 are input to a threshold decision unit 2403. A positive value threshold is set in the threshold decision unit 2403.

Figure 7B:
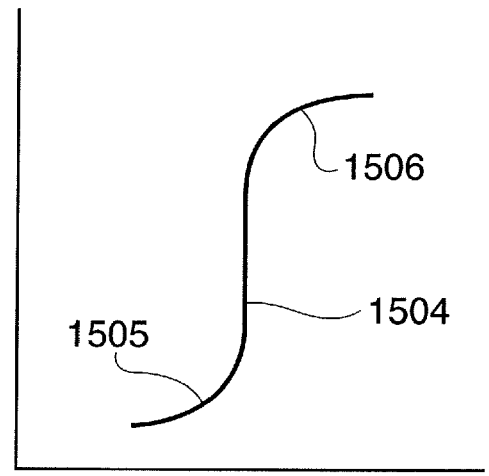
Figure 7C:
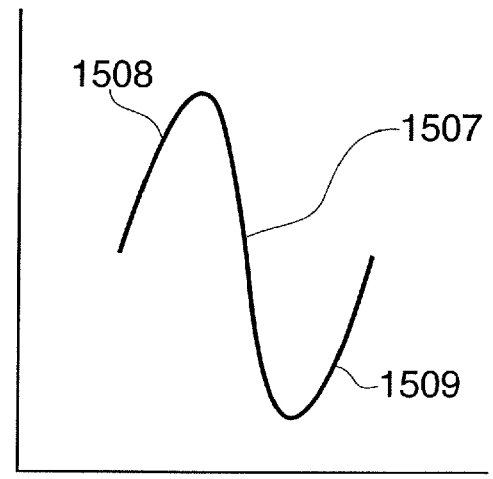

When using a secondary differential filter, the filtered signal values have positive or negative signs, and these are shown in FIGS. 7A to 7C for a case in which the image signals are luminance signals as in the present embodiment. The edge boundary area 1501 shown in the diagram indicates a portion of a black character (character edge) on the white background 1503. Numeral 1502 indicates the character inside area. Viewing the section 1510 of the edge boundary area 1501 as a signal level gives the image signal 1504. The character inside area 1502 is a dark area and therefore the signal level is low (1505). The background 1503 is a bright area and therefore the signal level is high (1506). The image signal 1504 subjected to digital filtering process using a secondary differential filter becomes the edge extraction signal 1507. The character inside area 1502 side takes a positive value and the background 1503 side takes a negative value.

The character-in-halftone dot decision aims at extracting the character itself within the halftone dot area and therefore a character in halftone dot signal 2404 is obtained by deeming the character outside edge as a halftone dot area and extracting the inside edge of the character. Thus, a positive threshold is set in the threshold decision unit 2403 and an inside edge signal is output when this positive threshold is exceeded. The foregoing process is described in further detail below.

Figure 17:
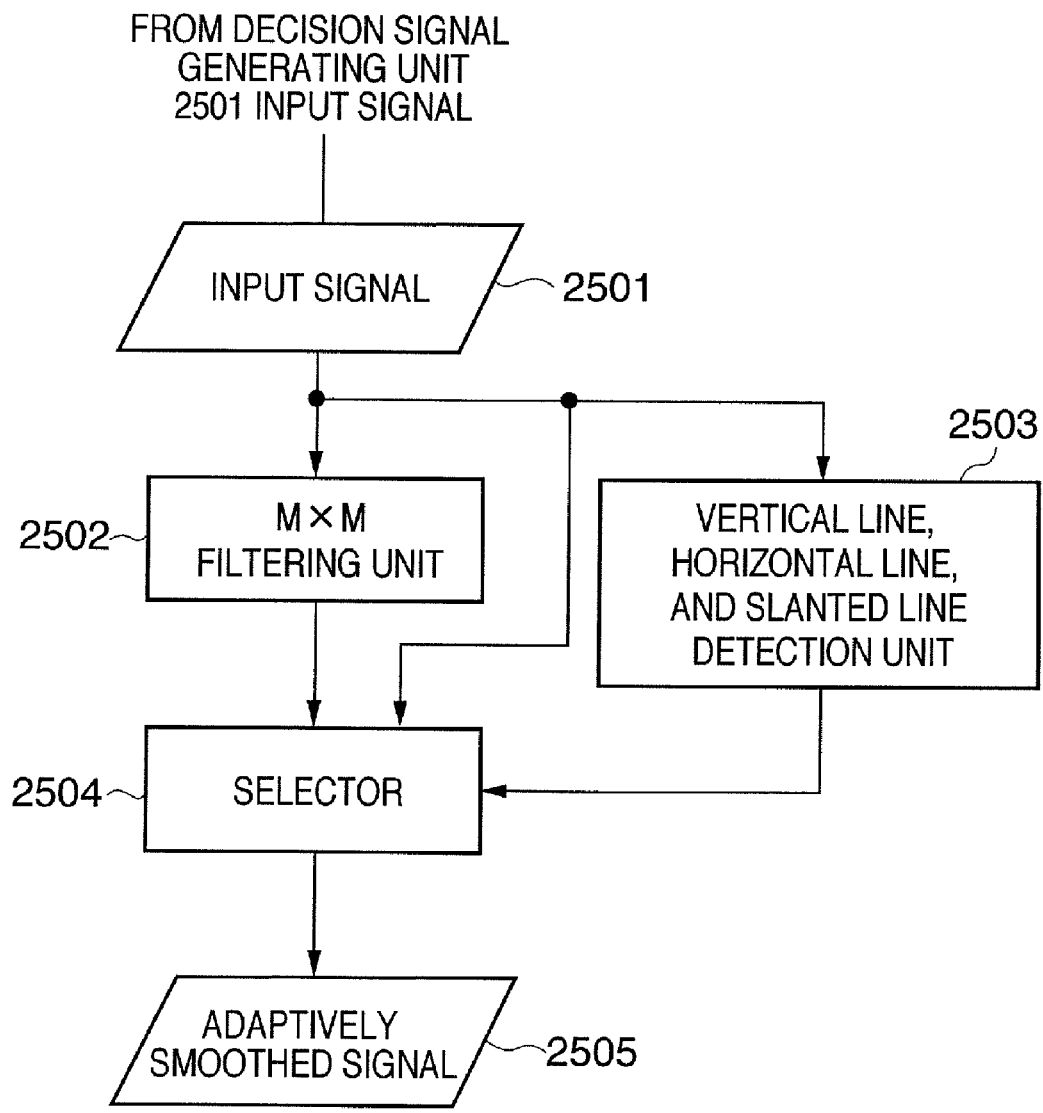
FIG. 17 is a block configuration diagram of an adaptive smoothing unit shown in FIG. 16.

First, using FIG. 17, specific description is given concerning the processing of the adaptive smoothing unit 2401 shown in FIG. 16.

FIG. 17 is a process block diagram of the adaptive smoothing unit 2401. An input signal 2501 is branched into three, and the first of these is input to an M×M filtering unit 2502 (M is a natural number) where it undergoes filtering. Here a smoothing process is executed aimed at reducing sensitivity in a prescribed frequency band. The M×M filtering unit 2502 supplies results of the smoothing process to a selector 2504.

The second of these is input to the selector 2504 without undergoing any processing. At this time, image delay occurs corresponding to the number of processing lines of the M×M filtering unit 2502, and therefore the input signals are supplied to the selector 2504 after being delayed using a delay memory (not shown).

The third of these is input to a vertical line, horizontal line, and slanted line detection unit 2503. Using a process buffer of M lines of the M×M filtering unit 2502, detection of vertical lines, horizontal lines, and slanted lines is carried out in an L×N (L and N are natural numbers and it is preferable that N≦M) area. Once a line portion is detected, a 1 bit signal is generated per pixel, which is used in switching the selector 2504.

Based on the selector switching signal outputted from the vertical line, horizontal line, and slanted line detection unit 2503, the selector 2504 switches between and outputs the filtered signal outputted from the M×M filtering unit 2502 and the unfiltered signal. At this time, an adaptively smoothed signal 2505 is output wherein when a line portion has been detected by the vertical line, horizontal line, and slanted line detection unit 2503, an unprocessed signal is output and when a line portion is not detected, a smoothed signal is output.

Here, description is given concerning the vertical line, horizontal line, and slanted line detection unit 2503. The vertical line, horizontal line, and slanted line detection unit 2503 detects line portions using patterns such as those shown in FIGS. 18A to 18D. It should be noted that the horizontal direction in the diagram indicates a main scanning direction of the image and the vertical direction indicates a sub scanning direction. From a perspective of sharing processing memory it is preferable that a number N of sub scanning direction lines (pixels) is smaller than a number M of sub scanning direction processing lines of the M×M filtering unit 2502, but there is no limitation to this. A number L of main scanning direction pixels may be larger than M. The present embodiment is described using an example in which line portions are detected in an area of main scanning direction (L) 7 pixels and sub scanning direction (N) 5 pixels.

Figure 18A:
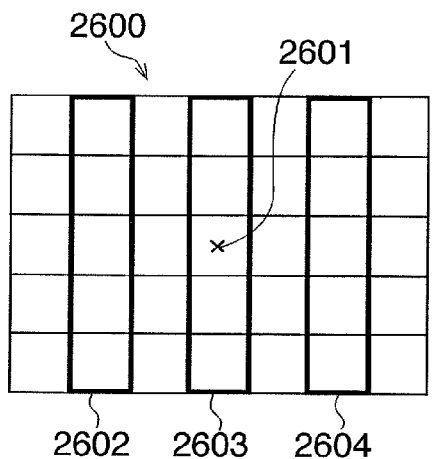
FIGS. 18A to 18D show examples of line portion detection patterns of a vertical line, horizontal line, and slanted line detection unit in FIG. 17.
Figure 18B:
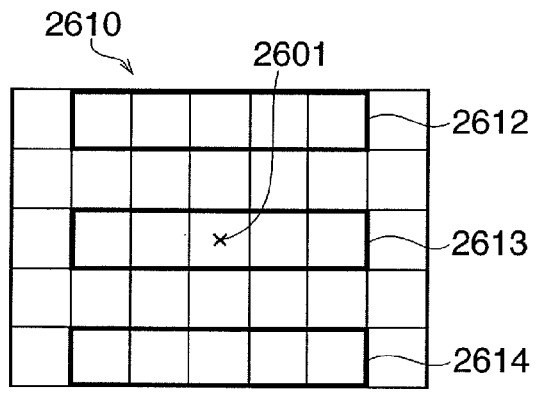
Figure 18C:
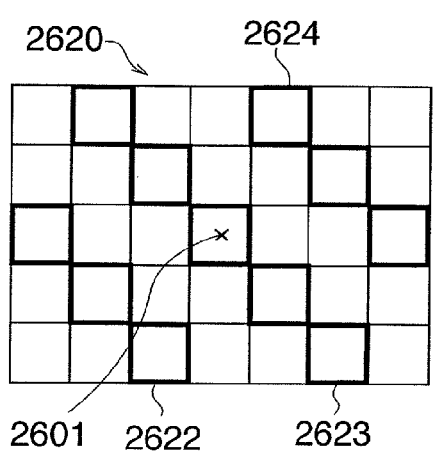
Figure 18D:
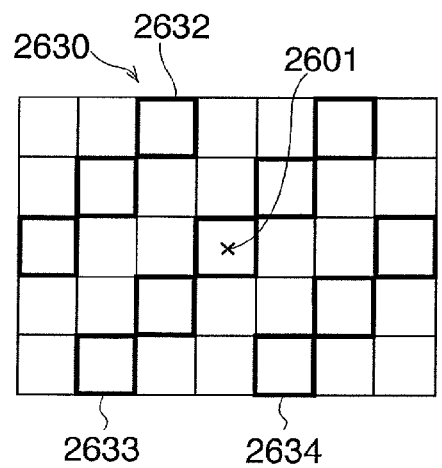

A pattern 2600 in FIG. 18A indicates a pattern for detecting vertical lines, a pattern 2610 in FIG. 18B indicates a pattern for detecting horizontal lines, and patterns 2620 and 2630 in FIGS. 18C and 18D, respectively, indicate patterns for detecting slanted lines. Here, description is given of a vertical line detection method using the pattern 2600.

The pattern 2600 is shown as a 7×5 area and arranged within this are 1×5 pixel blocks 2602, 2603, and 2604. A luminance total (ALL), a largest value (MAX), and a smallest value (MIN) are detected for each of these blocks.

At this time, the following conditional expressions are evaluated:

$$\text{MAX}(2602) - \text{MIN}(2602) \leq \text{threshold } Th1 \quad (1)$$

$$\text{MAX}(2603) - \text{MIN}(2603) \leq \text{threshold } Th1 \quad (2)$$

$$\text{ALL}(2603) \leq \text{ALL}(2602) - \text{threshold } Th2 \quad (3)$$

Condition (1) evaluates whether there is no shading variation in the five pixels within the 1×5 pixel block 2602. Condition 2 evaluates whether there is no shading variation in the five pixels within the 1×5 pixel block 2603. Condition 3 compares the luminance total of the 1×5 pixel block 2602 and the 1×5 pixel block 2603 and evaluates whether a luminance level of the 1×5 pixel block 2603 is relatively lower than that of the 1×5 pixel block 2602. When it is lower, it is decided that the 1×5 pixel block 2603 constitutes a black line.

And similarly, the following conditional expressions are evaluated:

$$\text{MAX}(2604) - \text{MIN}(2604) \leq \text{threshold } Th1 \quad (4)$$

$$\text{MAX}(2603) - \text{MIN}(2603) \leq \text{threshold } Th1 \quad (5)$$

$$\text{ALL}(2603) \leq \text{ALL}(2604) - \text{threshold } Th2 \quad (6)$$

Of the above six conditions, if conditions 1, 2, and 3 are all met simultaneously, or if conditions 4, 5, and 6 are all met simultaneously, then it is decided that the pixel of interest 2601 pertains to a vertical line.

Figure 19A:
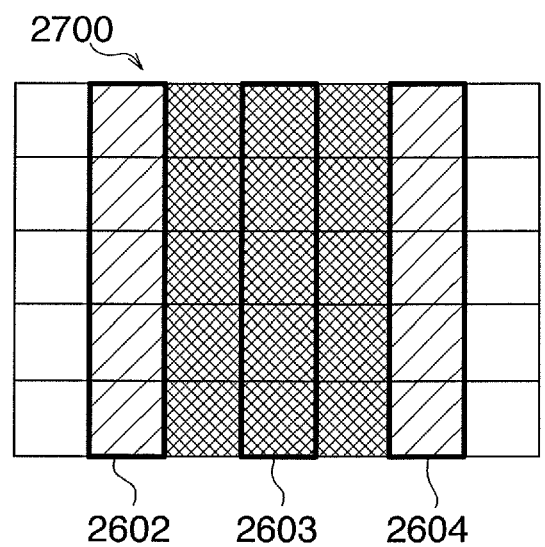
FIGS. 19A to 19C are diagrams illustrating detection examples of line portion detection patterns of the vertical line, horizontal line, and slanted line detection unit.
Figure 19B:
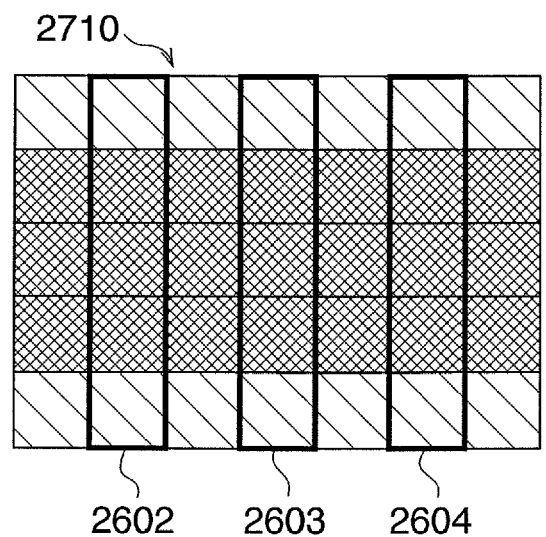
Figure 19C:
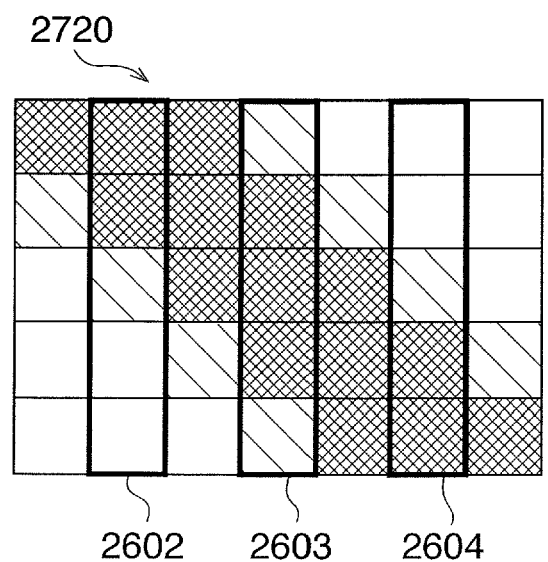

Specific examples are shown in FIGS. 19A to 19C. A pattern 2700 in FIG. 19A involves a 7×5 area extracted from an image having a vertical line on a white background. Dark portions and gray portions in the diagram show the vertical line that has been read. Description is given assuming 8-bit, 1 channel luminance signals (0 to 255) and, for convenience, black pixels being level 0, gray pixels (diagonal lines) being level 128, and white pixels being level 255. A threshold 1 is set to 20 and a threshold 2 is set to 200. When the above-described condition 1 is applied to the pattern 2700 to decide true/false, the following is obtained:

$$\text{MAX}(2602) - \text{MIN}(2602) \leq \text{threshold } Th1 \ 128 - 128 \leq 20 \rightarrow \text{true} \quad (1)$$

$$\text{MAX}(2603) - \text{MIN}(2603) \leq \text{threshold } Th1 \ 0 - 0 \leq 20 \rightarrow \text{true} \quad (2)$$

$$\text{ALL}(2603) \leq \text{ALL}(2602) - \text{threshold } Th2 \ 0 \times 5 \leq 128 \times 5 - 200 \rightarrow \text{true} \quad (3)$$

$$\text{MAX}(2604) - \text{MIN}(2604) \leq \text{threshold } Th1 \ 128 - 128 \leq 20 \rightarrow \text{true} \quad (4)$$

$$\text{MAX}(2603) - \text{MIN}(2603) \leq \text{threshold } Th1 \ 0 - 0 \leq 20 \rightarrow \text{true} \quad (5)$$

$$\text{ALL}(2703) \leq \text{ALL}(2704) - \text{threshold } Th2 \ 0 \times 5 \leq 128 \times 5 - 200 \rightarrow \text{true} \quad (6)$$

Condition (1), condition (2), and condition (3) are all true and therefore a vertical line is detected. Furthermore, condition (4), condition (5), and condition (6) are also all true and therefore a vertical line is detected by this decision also.

When this is applied to a pattern 2710 (horizontal line) in FIG. 19B, the true/false results of conditions 1 to 6 are as follows.
(1) false
(2) false
(3) false
(4) false
(5) false
(6) false
Thus, no vertical line portion is detected.

When this is applied to a pattern 2720 (slanted line) in FIG. 19C, the true/false results of conditions 1 to 6 are as follows.
(1) false
(2) false
(3) true
(4) false
(5) false
(6) true
Thus, here too no vertical line portion is detected.

The pixel blocks 2612, 2613 and 2614 of pattern 2610 shown in FIG. 18B are used to detect a horizontal line. The pixel blocks 2622, 2623, 2624, 2532, 2633 and 2634 of and patterns 2620 and 2630 in FIG. 18C and FIG. 18D are used to detect slanted lines.

Examples are shown in FIGS. 20A to 20C. A pattern 2810 in FIG. 20A is an example of horizontal line detection. Patterns 2820 and 2830 in FIG. 20B and FIG. 20C are examples of slanted line detection.

Depending on the thickness of the line, detection may not be possible with the present technique. Line portions having a certain degree of thickness will not be detected as line portions by any of the patterns shown in FIGS. 18A to 18D, but since these are detected as line portions as a result of the following process of the adaptive smoothing unit 2401, this is not a problem. Line portions such as these can be extracted when smoothed image signals are emphasized by the edge emphasizing unit 2402 and then undergo threshold processing by the threshold decision unit 2403. The present technique involves a process that aims to avoid high frequency extremely fine lines becoming an object of a smoothing filter.

Figure 21:
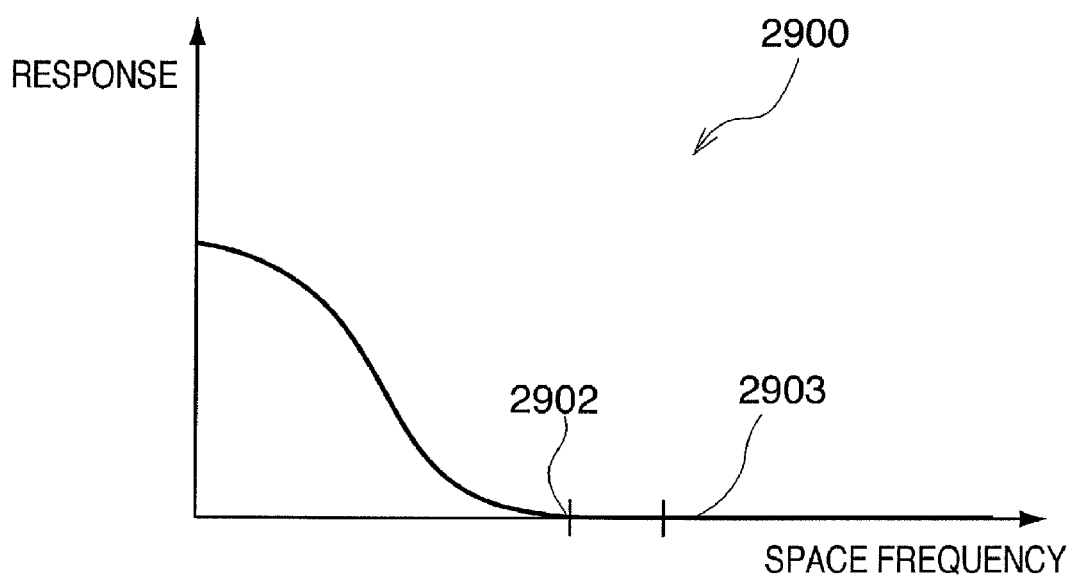
FIG. 21 shows space filter frequency characteristics used by the adaptive smoothing unit.

FIG. 21 shows one example of space filter frequency property 2900 used by the adaptive smoothing unit 2401. The horizontal axis indicates a space frequency property and the vertical axis indicates a frequency response corresponding to that. The frequency response becomes smaller for higher frequency bands and at or above a certain space frequency (2902) there is no response. Description is given using FIGS. 22A to 22C of an example of when a character-in-halftone dot decision is carried out involving the adaptive smoothing unit 2401 using this smoothing filter.

Figure 22A:
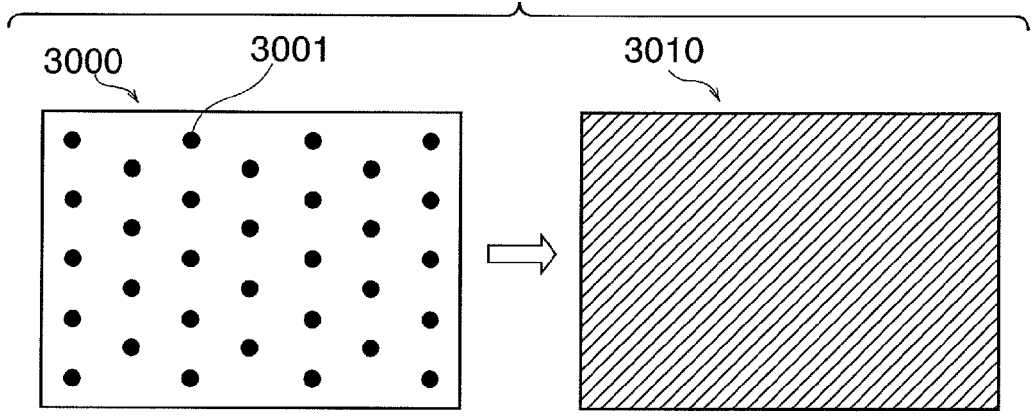
FIGS. 22A to 22C are diagrams illustrating specific processing examples of the adaptive smoothing unit.

An image 3000 in FIG. 22A is one portion extracted from a halftone dot image. The output screen frequency of the halftone dots (3001) is high, and in terms of the frequency property of the filter shown in FIG. 21, these are halftone dots having a property such that their space frequency is in a position indicated by numeral 2903. Thus, when the halftone dot image 3000 undergoes filtering by a filter having the space frequency property of FIG. 21, the periodic structure of the halftone dots is eliminated and a smoothed image 3010 is obtained.

Figure 22B:
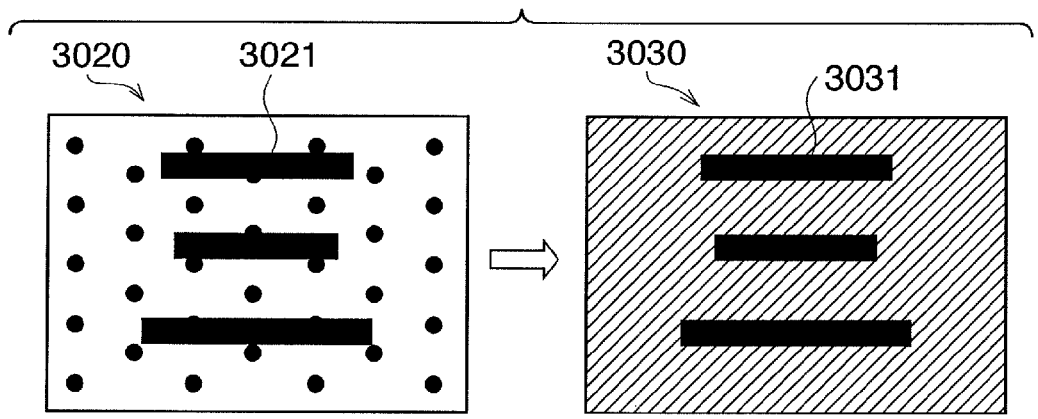
Figure 22C:
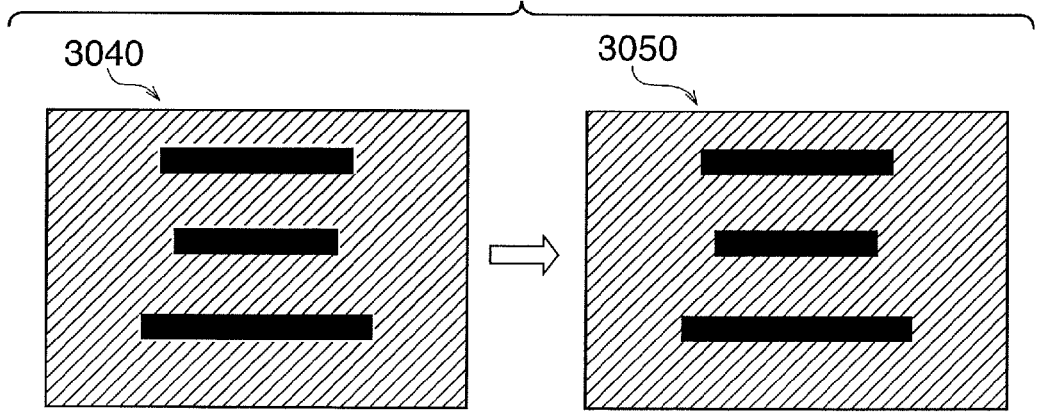

A case in which there is a character within halftone dots of the same screen frequency is described using FIG. 22B. A character 3021 is printed within a halftone dot image 3020 and when adaptive smoothing 2401 is executed on this image, a smoothed image 3030 is obtained. The halftone dot areas are smoothed and the periodic structure of the halftone dots is eliminated, while the character areas are excluded from smoothing by an adaptive process such that a character area 3031 remains clearly. When this image undergoes edge emphasizing by the edge emphasizing unit 2402, an image 3040 shown in FIG. 22C is obtained. The character edges are emphasized. When the emphasized image undergoes a threshold decision process by the threshold decision unit 2403, a character-in-halftone dot image 3050 is obtained. White areas are the areas decided as a character in halftone dots. A fine character is shown in the example for the present embodiment and therefore the entire character is extracted as a character in halftone dots. Although not shown in the diagrams, when the character size becomes large, rather than the entire character, edge portions (contours) of the character are extracted. [Description of attribute flag generating unit 1006]

The foregoing was a description of the character decision unit 1003, the halftone dot decision unit 1004, and the character-in-halftone dot decision unit 1005 according to the present embodiment. Next, description is given concerning the attribute flag generating unit 1006 according to the present embodiment.

The attribute flag generating unit 1006 generates an attribute flag for each pixel from the character decision results obtained by the character decision unit 1003, the halftone dot decision results obtained by the halftone dot decision unit 1004, and the character-in-halftone dot decision results obtained by the character-in-halftone dot decision unit 1005. The attribute flags to be generated are determined as follows.

For halftone dot signal: HIGH & character signal: LOW→image attribute of pixel of interest: halftone dot
For halftone dot signal: LOW & character signal: HIGH→image attribute of pixel of interest: character
For halftone dot signal: HIGH & character-in-halftone dot decision: HIGH→image attribute of pixel of interest: character in halftone dots
None of the above→image attribute of pixel of interest: natural image; photo image, tonal image By making these determinations, the attribute flags are generated. Since there are four types of attribute flags as described above, in the present embodiment, an attribute flag is constituted by two bits per pixel.

Various image processing methods such as amount of edge emphasizing, color reproduction method, and image forming method and the like can be controlled in response to the image attributes.
[Description of Print Processing]

Here, description is given concerning specific print processing taking into account the above description.

As described earlier, image data resulting from processing by the input image processing unit 104 (which is stored in the image memory 105) and attribute flag data generated by the image area separation processing unit 103 (which is stored in the flag memory 106) undergo compression coding to be stored in the storage unit 110. Description is given here of the print processing in accordance with the compression coded image data and flag data stored in the storage unit 110.

In timing with the printer engine 117 becoming available to print, the data decompression unit 112 reads out the data stored in the storage unit 110 and carries out a decompression process (decoding process). Image data obtained by decompression is stored in the image memory 114 and flag data is stored in the flag memory 115. The data decompression unit 112 may perform decompression in accordance with the same algorithm as the data compression unit 109 and therefore description thereof is not included.

The output image processing unit 116 generates output image data for the image data stored in the image memory 114 based on the per-pixel flag data stored in the flag memory 115 and outputs to the printer engine 117. Consequently hereinafter description is given mainly of the output image processing unit 116.

Figure 27:
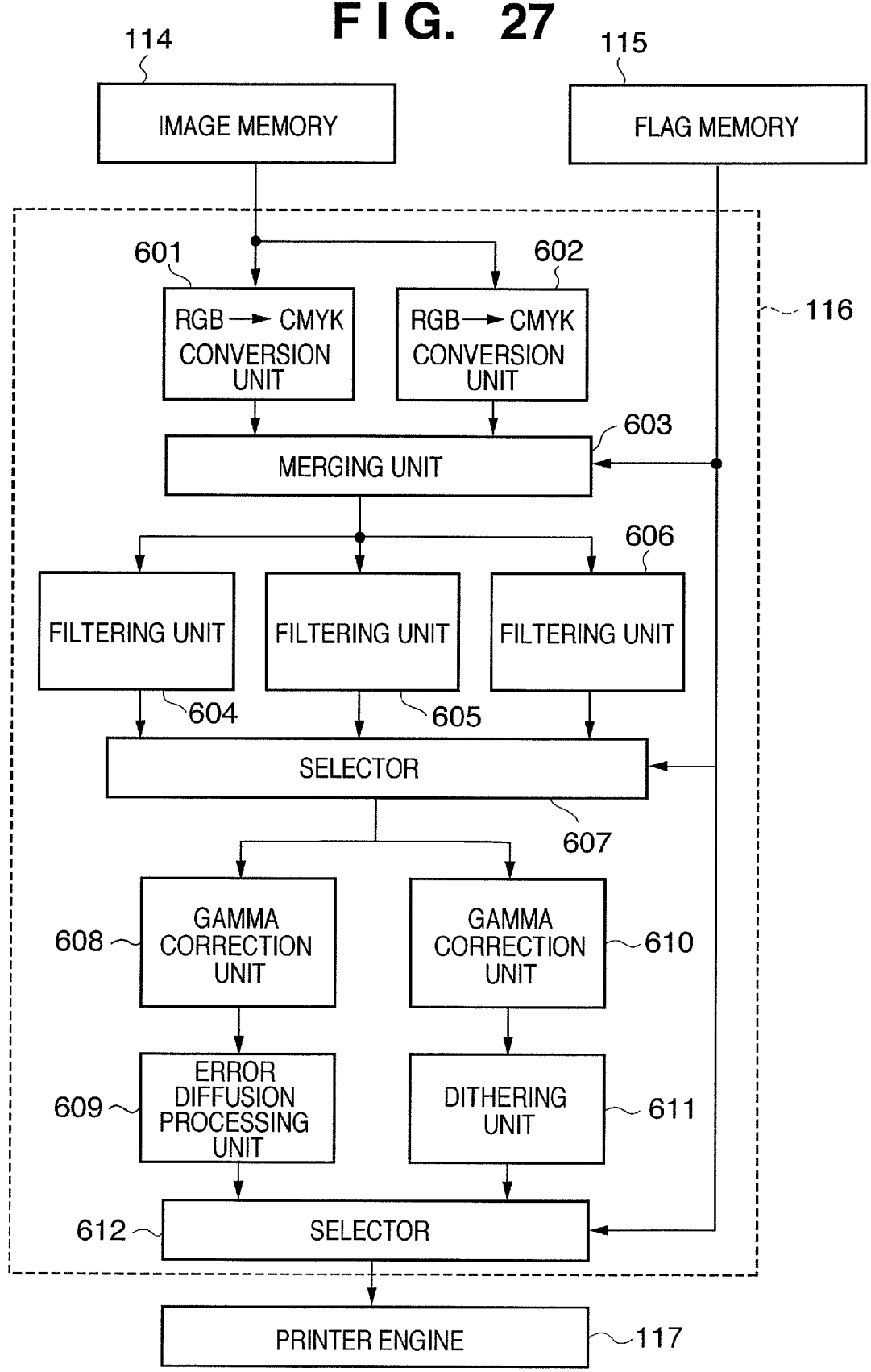
FIG. 27 is a block configuration diagram of an output image processing unit shown in FIG. 1.

FIG. 27 is a block configuration diagram mainly of the output image processing unit 116.

When image data and flag data of a preset printable data amount is stored in the image memory 114 and the flag memory 115 by the data decompression unit 112, these sets of image data and flag data are transferred to the output image processing unit 116.

RGB image data that has been read out from the image memory 114 is converted to recording color components of C (cyan), M (magenta), Y (yellow), and K (black) by RGB→CMYK conversion units 601 and 602. A difference between the RGB→CMYK conversion units 601 and 602 is that the former is a color space conversion unit specialized for character images and the latter carries out conversion for photo images and halftone dots.

Normally the color of characters printed in documents is black or several colors at the most. Consequently, in the present embodiment, the RGB CMYK conversion unit 601 converts to a closest approximate color of patterns of predefined colors (C, M, Y, and K). For example, when R≈G≈B≈0, a decision may be made that the pixel of interest is black and therefore conversion is made to a pattern of C=M=Y=0 and K=255. When the input R, G, and B are expressed in 8 bits, an LUT can be configured in which the respective several upper order bits (2 bits would be sufficient) are input and YMCK (each 8 bits) data is output.

On the other hand, the RGB→CMYK conversion unit 602 carries out high accuracy RGB→YMCK conversions. These conversions are carried out using matrix calculations but may also be achieved by an LUT having an RGB address input of a total of 24 bits and 32-bit YMCK output.

A merging unit 603 merges sets of the YMCK data from the two RGB->CMYK conversion units 601 and 602 based on the attribute data from the flag memory 115. Specifically, when the pixel of interest indicates "character," data output from the RGB→CMYK conversion unit 601 is selected and output. And when the pixel of interest indicates "natural image" or "halftone dot," data from the RGB→CMYK conversion unit 602 is selected and output. Then when the pixel of interest indicates "character in halftone dots," sets of data from the two color space conversion units 601 and 602 are merged in accordance with an appropriate weighting coefficient and output. Specifically, an average value of the two color conversion results is obtained.

CMYK data output from the merging unit 603 is supplied to filtering units 604 to 606. The filtering units 604 to 606 have buffers of several lines inside and carry out two dimensional filtering. A difference among the filtering units 604 to 606 is that they have different coefficients for deciding the extent of edge emphasizing in the filtering process.

The filtering unit 604 carries out a compatible filtering process when the attribute of the pixel of interest is "character." The filtering unit 605 carries out a compatible filtering process when the pixel of interest is for a "character in halftone dots." And the filtering unit 606 carries out a compatible filtering process when the pixel of interest is for a "photo image" or a "halftone dot." The extent of edge emphasizing in each filtering unit is: filtering unit 604>filtering unit 605>filtering unit 606.

However, this is merely one example of the aforementioned extent of edge emphasizing and the extent is not necessarily limited to this.

The above can be expressed in other words in that there is a relationship of the intensity of smoothing:

filtering unit 604<filtering unit 605<filtering unit 606.

When the attribute of the pixel of interest is "character," a selector 607 selects and outputs the data from the filtering unit 604. When this is "character in halftone dots," the data from the filtering unit 605 is selected and output, and when this is "photo" or "halftone dot," the data from the filtering unit 606 is selected and output.

Data selected and output from the selector 607 is supplied to gamma correction units 608 and 610. The gamma correction unit 608 carries out correction suited to "characters" and "characters in halftone dots" and the gamma correction unit 610 carries out correction suited to "halftone dots" and "photo images."

In the case of characters, it is preferable that the dots formed at the time of printing are not easily dispersed and therefore these are binarized by an error diffusion processing unit 609. Furthermore, photo images and halftone dots, for which tonality is viewed important, undergo a binarization process by a dithering unit 611 using a dither matrix.

When the attribute of the pixel of interest is "character" or "character in halftone dots," a selector 612 selects the data from the error diffusion processing unit 609 and outputs to the printer engine 117. When the attribute of the pixel of interest is "photo" or "halftone dot," the selector 612 selects the data from the dithering unit 611 and outputs to the printer engine 117.

As described above, by appropriately extracting character areas, halftone dot areas, and character areas in halftone dots, it becomes possible to implement adaptive image processing in response to the attributes thereof. Consequently, it becomes possible to reproduce character areas distinctly and photo areas smoothly. In particular, halftone dot areas and character areas in halftone dot documents are distinguished and smoothing can be carried out on halftone dot areas without smoothing character areas and therefore excellent moire removal can be achieved. As a result, images can be provided having high tonal reproduction qualities by performing smoothing on photo areas in halftone dot documents to perform moire removal and then executing dithering. Furthermore, by performing an edge emphasizing process then executing an error diffusion process for character areas in halftone dot documents, it is possible to provide crisp easy-to-read character reproduction qualities.

It should be noted that in the present embodiment an example was shown in which an error diffusion method and a dithering method were employed as a binarizing measure, but there is no limitation to this. For example, when using only the error diffusion method, of the character areas (including characters in halftone dots) and photos (including halftone dots), the size of the error diffusion matrix of the former can be made smaller and the error diffusion matrix of the latter can be made bigger. Furthermore, when using only a dithering process, different dither matrix patterns may be employed in character areas and photo areas. Also, methods other than this may be employed as binarizing methods.

Furthermore, here an example was given of binarization, but when the printer engine is capable of multi value recording, N-narization (pseudo halftones) may be implemented matched to a number N of gradations that can be recorded. For example, in the case of a laser beam printer, it is possible to generate a pulse width modulated signal in response to darkness using a commonly known PWM (pulse width modulation) technique to form dots of sizes corresponding to darkness. Furthermore, with an inkjet printer that ejects ink droplets, shading can be expressed by the number of times an ink droplet is ejected in a same position. In the case of a printer engine capable of expressing a single pixel in N gradations in this manner, rather than binarization, it is possible to achieve N-narization (N≧2), and therefore there is no limitation to binarization.

Second Embodiment

In the above-described embodiment (first embodiment), by appropriately extracting character areas, halftone dot areas, and character areas in halftone dots, adaptive processing was executed in response to the attributes thereof, but in the second embodiment, an example is shown in which the capability for extracting characters in halftone dots is controlled according to the screen frequency of the halftone dots.

As described in regard to the first embodiment, there is a wide range of halftone dot documents whose output screen frequencies range from low to high. Generally, when printing is carried out in a single color using a paper in which ink is well absorbed, a low screen frequency is used. For example, monochrome newspapers and the like are one example and the output screen frequency of these is typically 85 lpi. For ordinary full color printing, 175 lpi is often used, but 200 lpi may be used for photo collections and brochures. Output screen frequencies exceeding 300 lpi are used in recent high definition printing, but 150 lpi to 175 lpi is the mainstream for full color printing.

On the other hand, an image forming method of the image processing apparatus according to the present invention aims to improve image quality using a dithering process. Hitherto, error diffusion related image forming methods that inhibit occurrences of moire have been the mainstream, but in recent years dithering (screening) processes have become used for offering smooth, high tonal reproduction qualities. However, with dithering processes, there is a problem of interference patterns occurring easily, which is referred to as moire that occurs due to interference between the periodic structure of the halftone dots of the document and the dithering periods. In order to avoid this, moire removal processes are executed such as smoothing of halftone dot areas, but character areas in the halftone dots also end up being smoothed, resulting in a problem of characters becoming difficult to read. Consequently, in the first embodiment, achieving the reproduction qualities for both characters and photos was aimed at distinguishing between halftone dots and characters in halftone dots in halftone dot documents, then performing moire removal in halftone dot areas and executing an emphasizing process for characters in halftone dots.

However, in halftone dot documents there are halftone dot documents having various output screen frequencies, from low output screen frequencies typified by monochrome newspapers to high output frequencies such as for brochures and photo collections. For this reason, reproduction qualities for both characters in halftone dots and photos cannot always be achieved for all documents. In particular, halftone dot edges and characters in halftone dots are sometimes decided incorrectly in halftone dot documents having low output screen frequencies and moire removal does not function effectively when attempting to extract characters in halftone dots such that moire may occur.

Furthermore, the moire removal process described in the present embodiment is a method that uses a space filter and therefore its effect is dependent on the processing size of the filter. For example, the effect is greater for 5×5 than for 3×3 and the effect is greater for 7×7 than for 5×5. Thus, the moire removal effect of the same filter size is greater for halftone dots of high screen frequencies than for halftone dots of low screen frequencies. Also, halftone dots have an output angle in addition to an output screen frequency and therefore a difference in effect may occur when using a space filter for moire removal depending on the angle.

Accordingly, a method is proposed by which high quality copy images are provided no matter what kind of document is copied and without causing moire.

Figure 23:
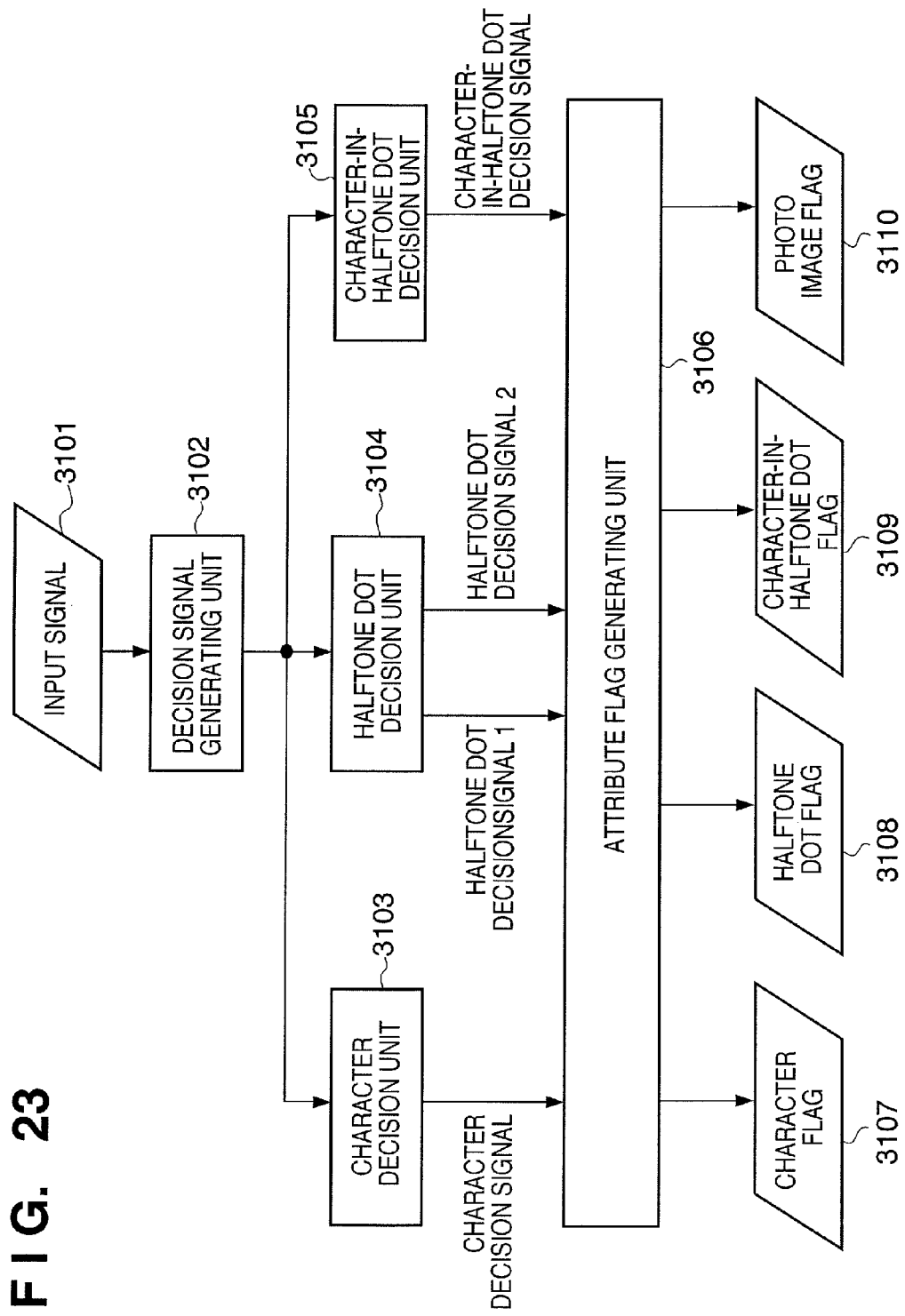
FIG. 23 is a block configuration diagram of an exemplary image area separation processing unit.

An image area separation process that achieves this is described. FIG. 23 is a block configuration diagram of this. This drawing includes items corresponding to FIG. 2 of the first embodiment.

An input signal 3101 is input to a decision signal generating unit 3102. For example, when the input signals are RGB signals (8 bits each), a grayscale signal (8 bits) is generated. At this time, it is possible that only the G channel of RGB channels is drawn out and it is also possible that it is determined by a calculation such as (R+2×G+B)/4 or the like. The number of input signal channels and the number of bits are not limited to these. Also, in regard to decision signal generating methods, channel numbers, and bit numbers, the foregoing was merely an example.

The decision signals generated by the decision signal generating unit 3102 are supplied to a character decision unit 3103, a halftone dot decision unit 3104, and a character-in-halftone dot decision unit 3105, where halftone dot deciding, character deciding, and character-in-halftone dot deciding are executed, respectively. At this time, the halftone dot decision unit 3104 generates two or more halftone dot decision signals.

The decision signals generated at each decision unit 3103, 3104 and 3105 undergo a comparison calculation at an attribute flag generating unit 3106 and attribute flags are generated. In the second embodiment, description is given concerning a case of generating a character flag 3107, a halftone dot flag 3108, a character-in-halftone dot flag 3109 and a photo image flag 3110. Based on these attribute flags, optimal image processing is executed according to characteristics of the image contained in the document image.

A processing configuration of the halftone dot decision unit 3104 is substantially equivalent to FIG. 4. Specific description is given concerning isolation amount decision units 1205 and 1206 therein.

As described in the first embodiment, the isolation amount decision unit 1205 inputs inside edge signals that are output from the threshold decision unit 1203. Similarly, the isolation amount decision unit 1206 inputs outside edge signals that are output from the threshold decision unit 1204. The processes of the isolation amount decision unit 1205 and the isolation amount decision unit 1206 are equivalent and therefore description is given here of an example of processing by the isolation amount decision unit 1205.

Figure 24:
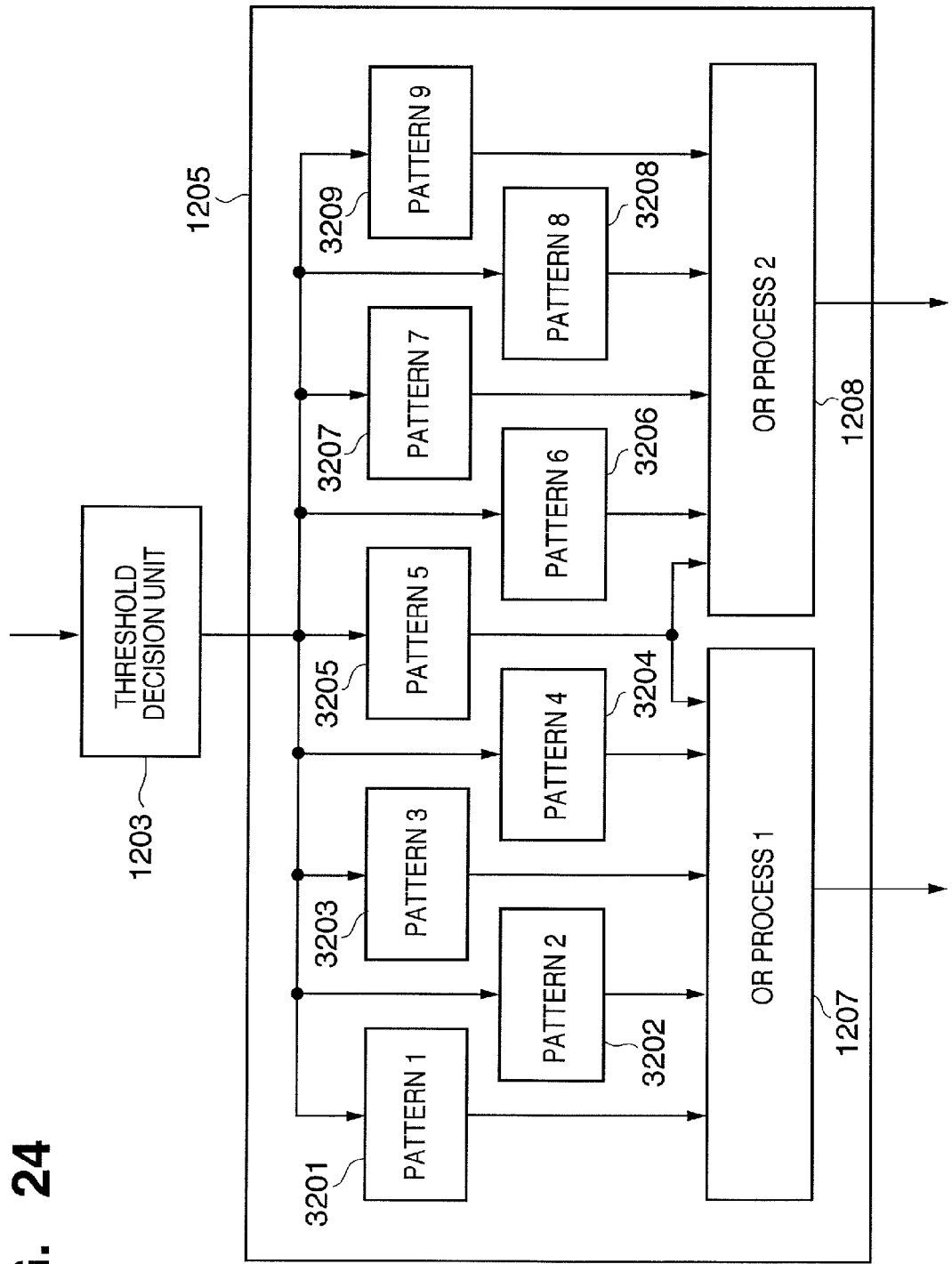
FIG. 24 is a block configuration diagram of an isolation amount decision unit.

FIG. 24 is a block configuration diagram of the isolation amount decision unit 1205. The isolation amount decision unit 1205 carries out a pattern matching process on inside edge signals. Halftone dot documents range from those whose output screen frequencies are low screen frequencies to those whose output screen frequencies are high screen frequencies and therefore the sizes and intervals (distances) of the halftone dots vary depending on the document. For this reason, pattern matching is carried out using a plurality of patterns so as to be able to detect halftone dots of any kind of screen frequency.

Figure 25A:
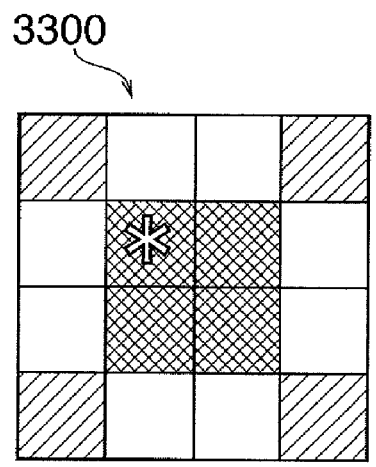
FIGS. 25A and 25B show examples of patterns of the isolation amount decision unit.
Figure 25B:
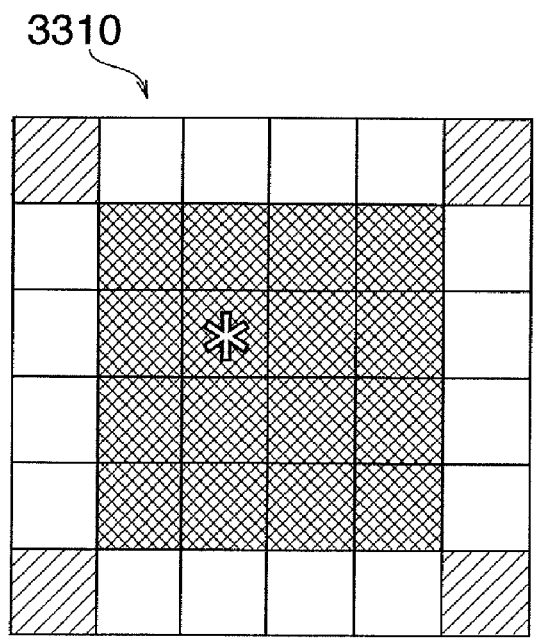

In the processing configuration shown in FIG. 24, pattern matching is executed with nine types of patterns 3201-3209, but there is no limitation to this. Examples of patterns are shown in FIGS. 25A and 25B. A pattern 3300 in FIG. 25A is one example of a pattern for detecting halftone dots of high screen frequencies. And a pattern 3310 in FIG. 25B is one example of a pattern for detecting halftone dots of low screen frequencies. Compared to halftone dots of high screen frequencies, halftone dots of low screen frequencies are large in size and therefore the output size of the threshold decision also becomes large. It is necessary to prepare a plurality of pattern sizes so as to be able to detect various sizes of halftone dots. When pattern 1 (3201) to pattern 5 (3205) of FIG. 24 are set as patterns for low screen frequencies, five types of larger pattern masks such as the pattern 3310 are prepared. The OR processor 1 (1207) performs logical OR calculation of the outputs from the pattern 1 (3201) to pattern 5 (3205) and outputs the result of the calculation. When pattern 5 (3205) to pattern 9 (3209) are set as patterns for high screen frequencies, smaller pattern masks such as the pattern 3300 are prepared. The OR processor 2 (1208) performs logical OR calculation of the outputs from the pattern 5 (3205) to pattern 9 (3209) and outputs the result of the calculation. By preparing a plurality of types of mask sizes in this manner it is possible to support a plurality of output screen frequencies of halftone dots. Furthermore, by preparing the sizes of the pattern masks incrementally, it is possible to support the sizes of output screen frequencies of halftone dots. Furthermore, as shown in FIG. 24, the pattern 5 may be shared for both low screen frequencies and high screen frequencies.

These patterns are merely one example, and pattern masks may be prepared giving consideration to such factors as the output screen frequency, the angle, the luminance (halftone dot ratio) and the like of the halftone dots. It should be noted that a specific matching method is as described for the first embodiment. And the processing from the isolation amount decision onward is as shown in FIG. 4.

By giving consideration to the output screen frequencies of halftone dots in this manner and carrying out the isolation amount decisions with pattern matching that varies according to the sizes thereof, it becomes possible to generate halftone dot signals corresponding to the output screen frequencies of halftone dots. Here description was given of an example in which the halftone dot signals were divided into two types, but there is no limitation to this. There may be more types than this as necessary. Furthermore, the output screen frequencies of halftone dots to be detected may be completely discerned to generate the halftone dot signal 1 (1215) and the halftone dot signal 2 (1216), but detection may also be performed by overlapping the output screen frequencies to be discerned. For example, the halftone dot signal 1 may be detected for 150 lpi or less and the halftone dot signal 2 may be detected for 100 lpi or more.

Figure 26:
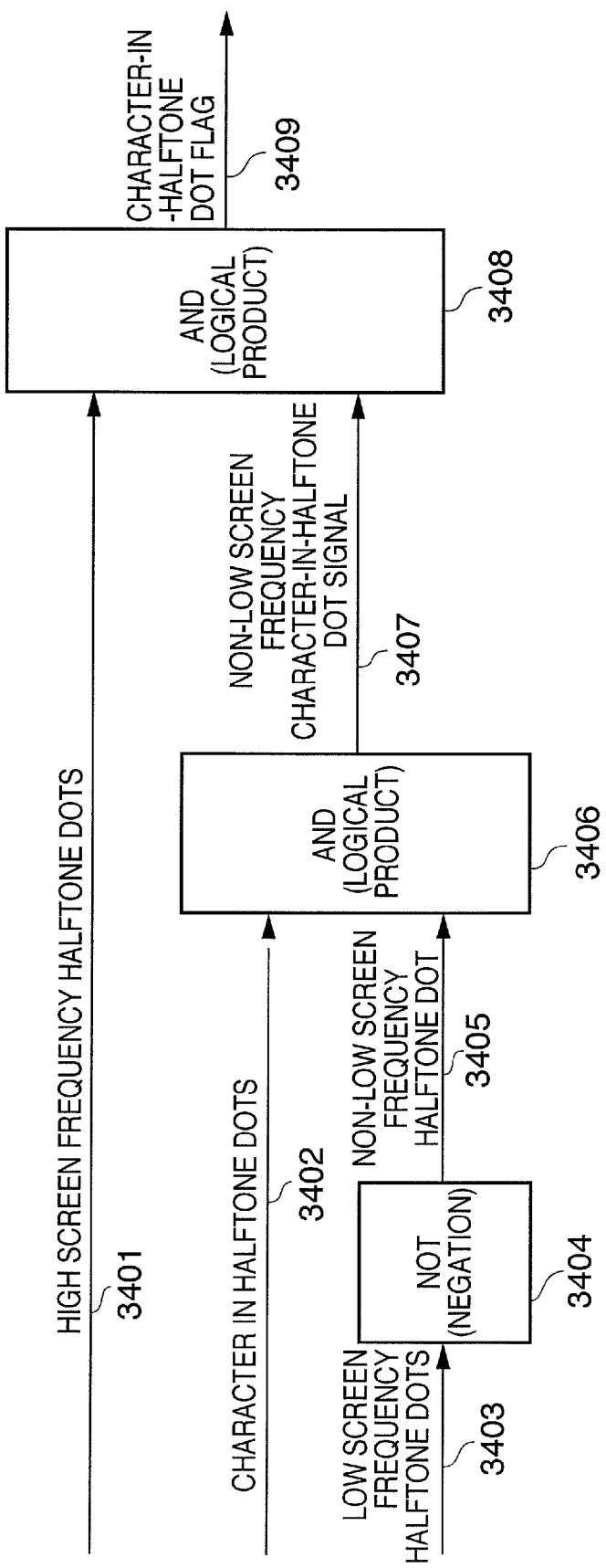
FIG. 26 is a block configuration diagram of the character-in-halftone dot decision unit.

The thus-detected two types of halftone dot signals, the character decision signal, and the character-in-halftone dot decision signal are input to the attribute flag generating unit 3106 where the respective decision signals undergo comparison calculations to generate attribute flags. In the present second embodiment, three types of flags, namely the character flag 3107, the halftone dot flag 3108, and the character-in-halftone dot flag 3109 are generated, but description is given using FIG. 26 in particular concerning a generation method of a character-in-halftone dot flag of the character-in-halftone dot decision unit 3105.

A character-in-halftone dot flag 3409 is generated based on a high screen frequency halftone dot signal 3401, a low screen frequency halftone dot signal 3403, and a character-in-halftone dot signal 3402. The low screen frequency halftone dot signal 3403 is negated (NOT) in a negating circuit 3404 and converted to a non-low screen frequency halftone dot signal 3405. A logical product (AND) of the converted non-low screen frequency halftone dot signal 3405 and the character-in-halftone dot signal 3402 is obtained by an AND (logical product) circuit 3406 to generate a non-low screen frequency character-in-halftone dot signal 3407. A logical product (AND) of the generated non-low screen frequency character-in-halftone dot signal 3407 and the high screen frequency halftone dot signal 3401 is obtained by an AND (logical product) circuit 3408 to generate a character-in-halftone dot flag 3409.

The thus-generated character-in-halftone dot flag 3409 means that only characters in halftone dot documents whose output screen frequency is a high screen frequency are extracted. Characters in halftone dot documents whose output screen frequency is a low screen frequency are negated in advance and therefore not extracted.

By using a configuration such as this for ordinary color documents, smooth reproduction can be achieved for halftone dot areas by performing moire removal. Furthermore, character areas in halftone dots can be reproduced distinctly by performing an appropriate emphasizing process and it becomes possible to achieve improved image quality for both characters in halftone dot documents and photos. Furthermore, for halftone dot documents having low screen frequencies such as newspapers, smooth reproduction can be achieved without causing moire. Furthermore, reproduction of characters in halftone dots can be improved when copying printed materials of any screen frequency without causing moire. Furthermore, by controlling screen frequency for detection of high screen frequency halftone dots and low screen frequency halftone dots it becomes possible to control the output screen frequencies of halftone dots for which improving the reproduction quality of characters in halftone dots is aimed at.

Embodiments of the present invention have been described above, but the description of the embodiments is only an example of the present invention, which is not limited to only the above description. For example, thresholds of "2" were set in the threshold decision units 1107 and 1108, but there is no limitation to this. Furthermore, the thresholds of the threshold decision units 2021 to 2023 in FIG. 12 were set to 5% of the surface area, but this too may be appropriately corrected.

Furthermore, the embodiments were described using an example of application to a copier, but these may also be applied to ordinary information processing apparatuses such as personal computers and the like to which an image scanner and printer are connected. In this case, the invention is achieved mainly using an application program executed on the information processing apparatus. The application includes program modules (functions or subroutines) corresponding to each processing unit excluding the scanner 101 and the printer engine 117 in FIG. 1, with memory being maintained from a RAM provided in the information processing apparatus and a hard disk or like being utilized for the storage unit 110.

Further still, normally a computer program is stored on a computer-readable storage medium such as a CD-ROM. To make it executable, it is necessary for it to be loaded into a reading device (for a CD-ROM this is a CD-ROM drive) on the computer and copied or installed onto the system.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2006-135865 filed on May 15, 2006, which is hereby incorporated by reference herein in its entirety.

What is claimed is:

1. An image processing apparatus in which an attribute of each pixel constituting image data is decided, comprising:
   a generation unit adapted to generate a decision signal having luminance as a main component from the image data;
   an adaptive filter unit adapted to decide whether there is continuity in low luminance pixels of a preset plurality of directions based on the decision signal generated by the generation unit, and allow the decision signal to pass when it is decided that there is continuity and carry out a low pass filter process defined by a preset frequency when it is decided that there is no continuity; and
   a character-in-halftone dot decision unit adapted to, based on the decision decided by the adaptive filter unit, generate inside edge data indicating whether a pixel of interest is positioned on an image edge of a low luminance side at which the luminance changes from low luminance to high luminance and decide whether the pixel of interest is a character area in a halftone dot area based on the generated inside edge data;
   a detection unit adapted to detect a first halftone dot signal and a second halftone dot signal having a halftone dot output screen frequency lower than that of the first halftone dot signal; and
   a flag generating unit adapted to generate a flag indicating a character in halftone dots based on a detection result of the detection unit and a decision result of the character-in-halftone dot decision unit;
   wherein the flag generating unit generates a flag indicating the character in halftone dots by negating the second halftone dot signal to generate a second non halftone dot signal, obtaining a logical product of the second non halftone dot signal and a character in halftone dot signal decided as a character in halftone dots by the character-in-halftone dot decision unit, so as to generate a non-low screen frequency character-in-halftone dot signal and obtaining a logical product of the generated non-low screen frequency character-in-halftone dot signal and the first halftone dot signal.

2. A method of an image processing apparatus in which an attribute of each pixel constituting image data is decided, comprising:
   a generation step of generating a decision signal having luminance as a main component from the image data;
   an adaptive filter step of deciding whether there is continuity in low luminance pixels of a preset plurality of directions based on the decision signal generated in the generation step, and allowing the decision signal to pass when it is decided that there is continuity and carrying out a low pass filter process defined by a preset frequency when it is decided that there is no continuity; and
   a character-in-halftone dot decision step of, based on decision signals generated in the adaptive filter step, generating inside edge data indicating whether a pixel of interest is positioned on an image edge of a low luminance side at which the luminance changes from low luminance to high luminance and deciding whether the pixel of interest is a character area in a halftone dot area based on the generated inside edge data;
   a detection step of detecting a first halftone dot signal and a second halftone dot signal having a halftone dot output screen frequency lower than that of the first halftone dot signal; and
   a flag generating step of generating a flag indicating a character in halftone dots based on a detection result of the detection step and a decision result of the character-in-halftone dot decision step;
   wherein the flag generating step includes generating a flag indicating the character in halftone dots by negating the second halftone dot signal to generate a second non halftone dot signal, obtaining a logical product of the second non halftone dot signal and a character in halftone dot signal decided as a character in halftone dots in the character-in-halftone dot decision step so as to generate a non-low screen frequency character-in-halftone dot signal, and obtaining a logical product of the generated non-low screen frequency character-in-halftone dot signal and the first halftone dot signal.

3. A non-transitory computer-readable storage medium storing a computer program, that by being read in and executed by a computer, functions as an image processing apparatus in which an attribute of each pixel constituting image data is decided, the computer program functioning as:
   a generation unit adapted to generate a decision signal having luminance as a main component from the image data;
   an adaptive filter unit adapted to decide whether there is continuity in low luminance pixels of a preset plurality of directions based on the decision signal generated by the generation unit and allow the decision signal to pass when it is decided that there is continuity and carry out a low pass filter process defined by a preset frequency when it is decided that there is no continuity; and
   a character-in-halftone dot decision unit adapted to, based on the decision decided by the adaptive filter unit, generate inside edge data indicating whether a pixel of interest is positioned on an image edge of a low luminance side at which the luminance changes from low luminance to high luminance and decide whether the pixel of interest is a character area in a halftone dot area based on the generated inside edge data;
   a detection unit adapted to detect a first halftone dot signal and a second halftone dot signal having a halftone dot output screen frequency lower than that of the first halftone dot signal; and a flag generating unit adapted to generate a flag indicating a character in halftone dots based on a detection result of the detection unit and a decision result of the character-in-halftone dot decision unit;
   wherein the flag generating unit generates a flag indicating the character in halftone dots by negating the second halftone dot signal to generate a second non halftone dot signal, obtaining a logical product of the second non halftone dot signal and a character in halftone dot signal decided as a character in halftone dots by the character-in-halftone dot decision unit, so as to generate a non-low screen frequency character-in-halftone dot signal and obtaining a logical product of the generated non-low screen frequency character-in-halftone dot signal and the first halftone dot signal.

* * * * *